United States Patent
Cho et al.

(10) Patent No.: US 10,681,537 B2
(45) Date of Patent: Jun. 9, 2020

(54) METHOD FOR TRANSRECEIVING DATA IN WIRELESS COMMUNICATION SYSTEM AND DEVICE SUPPORTING SAME

(71) Applicant: LG ELECTRONICS INC., Seoul (KR)

(72) Inventors: Heejeong Cho, Seoul (KR); Jiwon Kang, Seoul (KR); Heejin Kim, Seoul (KR); Ilmu Byun, Seoul (KR); Hyunjin Shim, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/077,373

(22) PCT Filed: Feb. 10, 2017

(86) PCT No.: PCT/KR2017/001479
§ 371 (c)(1),
(2) Date: Aug. 10, 2018

(87) PCT Pub. No.: WO2017/138768
PCT Pub. Date: Aug. 17, 2017

(65) Prior Publication Data
US 2019/0053044 A1 Feb. 14, 2019

Related U.S. Application Data

(60) Provisional application No. 62/351,278, filed on Jun. 16, 2016, provisional application No. 62/305,541,
(Continued)

(51) Int. Cl.
*H04W 8/26* (2009.01)
*H04W 76/11* (2018.01)
(Continued)

(52) U.S. Cl.
CPC ............. *H04W 8/26* (2013.01); *H04W 12/06* (2013.01); *H04W 28/0268* (2013.01);
(Continued)

(58) Field of Classification Search
None
See application file for complete search history.

(56) References Cited

U.S. PATENT DOCUMENTS

2012/0315874 A1  12/2012  Li et al.
2013/0077501 A1   3/2013  Krishnaswamy et al.
(Continued)

FOREIGN PATENT DOCUMENTS

CN    102014372    4/2011
EP      2007083    12/2008
(Continued)

OTHER PUBLICATIONS

PCT International Application No. PCT/KR2017/001479, International Search Report dated May 30, 2017, 4 pages.
(Continued)

*Primary Examiner* — James P Duffy
(74) *Attorney, Agent, or Firm* — Lee Hong Degerman Kang Waimey

(57) ABSTRACT

The present invention relates to a method and a device for allocating an address of a terminal for transreceiving in a wireless communication system. According to the present invention, provided are the method and the device for: transmitting a first request message requesting context information of a terminal to a home subscriber server (HSS); receiving a first reply message including the context information from the HSS; transmitting a second request message requesting a session configuration for transreceiving data of the terminal to a gateway; and receiving from the gateway a second reply message including a session identifier indi-
(Continued)

```
IMSI #15
Default APN,
Subscribed QoS Profile,
GW IP : X.X.X.X
UE Fixed IP : Y.Y.Y.Y
.........
Linked IMSI list = #39
```
(a) Context information of UE 1

```
IMSI #39
Default APN,
Subscribed QoS Profile,
GW IP : X.X.X.X
UE Fixed IP : Y.Y.Y.Y
.........
Linked IMSI list = #15
```
(b) Context information of UE 2 cating a session configured in response to the second request message.

10 Claims, 19 Drawing Sheets

Related U.S. Application Data filed on Mar. 9, 2016, provisional application No. 62/293,774, filed on Feb. 11, 2016.

(51) Int. Cl.
*H04W 12/06* (2009.01)
*H04W 28/02* (2009.01)
*H04W 8/04* (2009.01)
*H04W 8/08* (2009.01)
*H04W 88/16* (2009.01)

(52) U.S. Cl.
CPC .............. *H04W 76/11* (2018.02); *H04W 8/04* (2013.01); *H04W 8/08* (2013.01); *H04W 88/16* (2013.01)

(56) References Cited

U.S. PATENT DOCUMENTS

| | | |
|---|---|---|
| 2013/0155948 A1 | 6/2013 | Pinheiro et al. |
| 2014/0126458 A1 | 5/2014 | Cho et al. |
| 2015/0049610 A1 | 2/2015 | Kim et al. |

FOREIGN PATENT DOCUMENTS

| | | |
|---|---|---|
| EP | 2472790 | 7/2012 |
| EP | 2728947 | 5/2014 |
| WO | 2014191032 | 12/2014 |

OTHER PUBLICATIONS

European Patent Office Application Serial No. 17750460.2, Search Report dated May 29, 2019, 12 pages.

[FIG. 1]
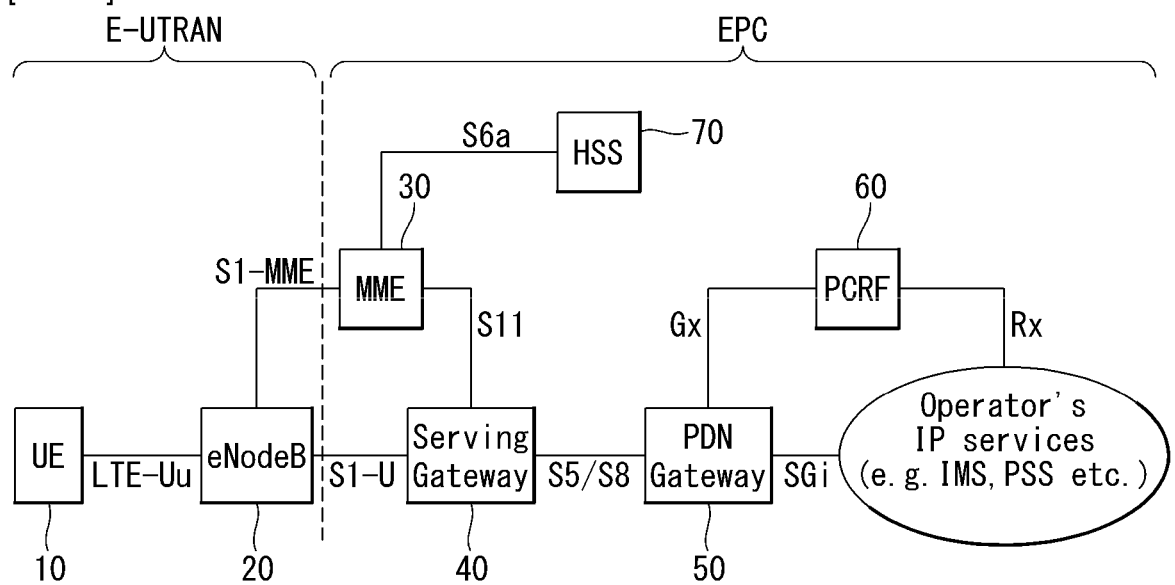

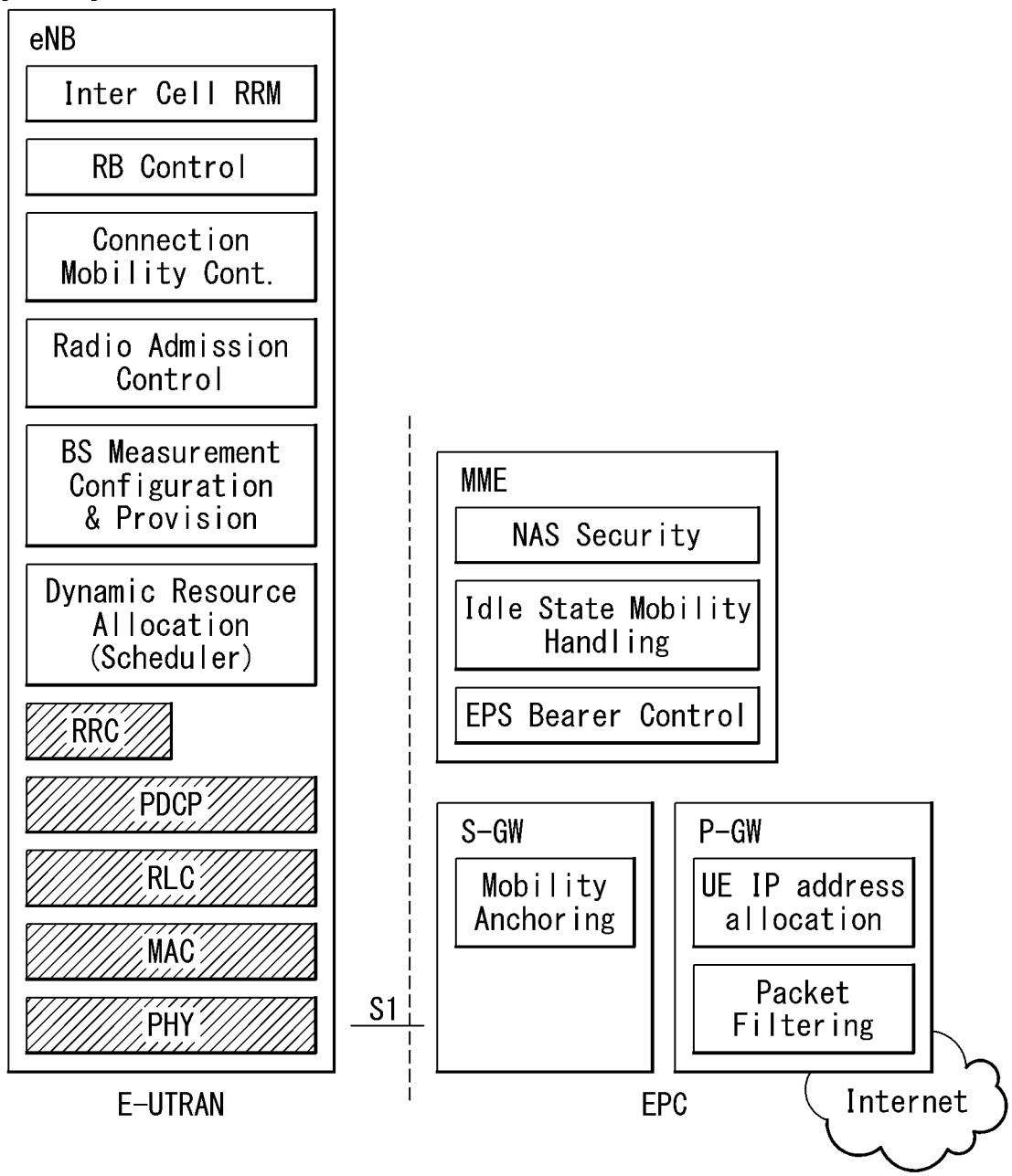
[FIG. 2]

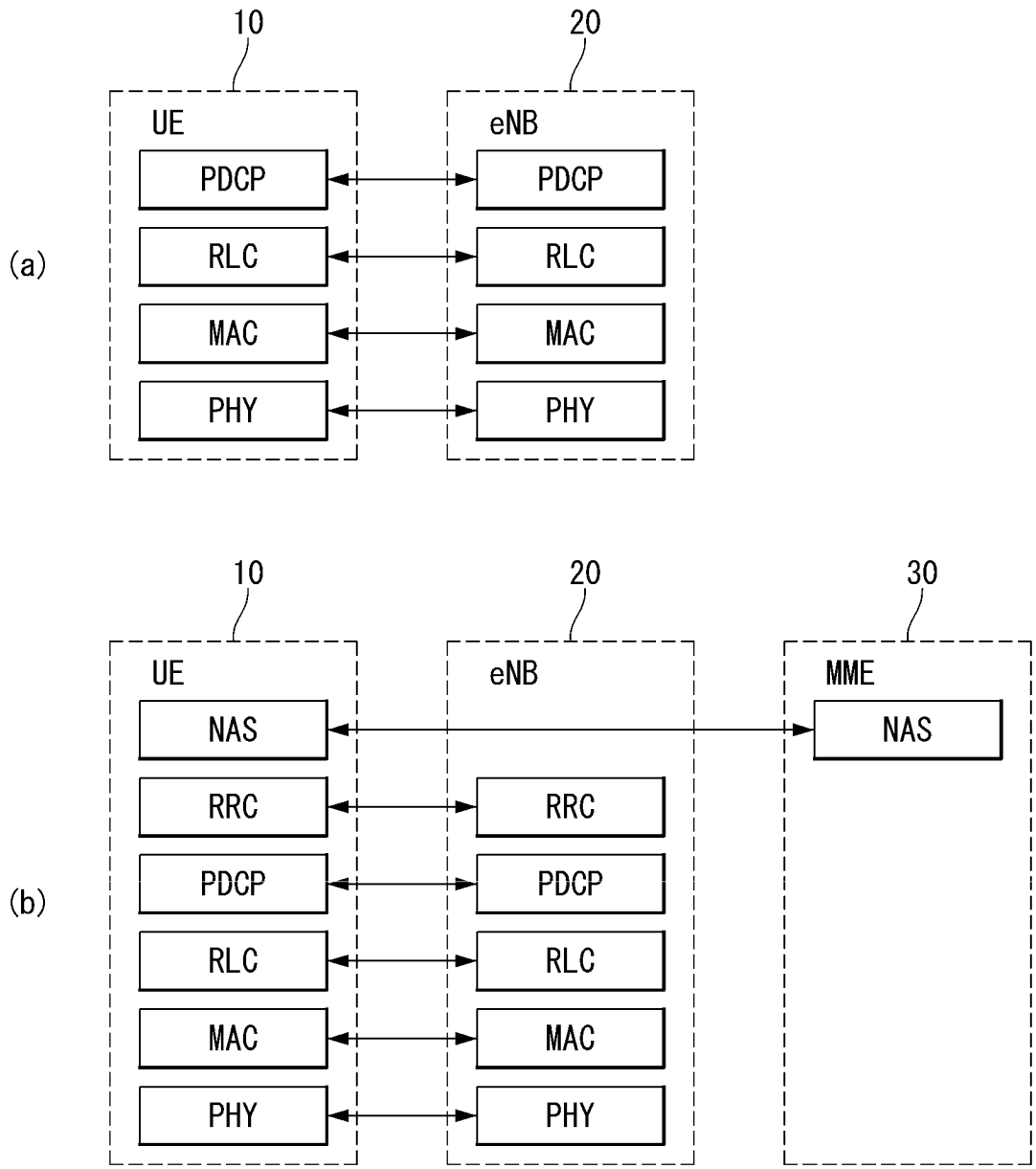
[FIG. 3]

[FIG. 4]
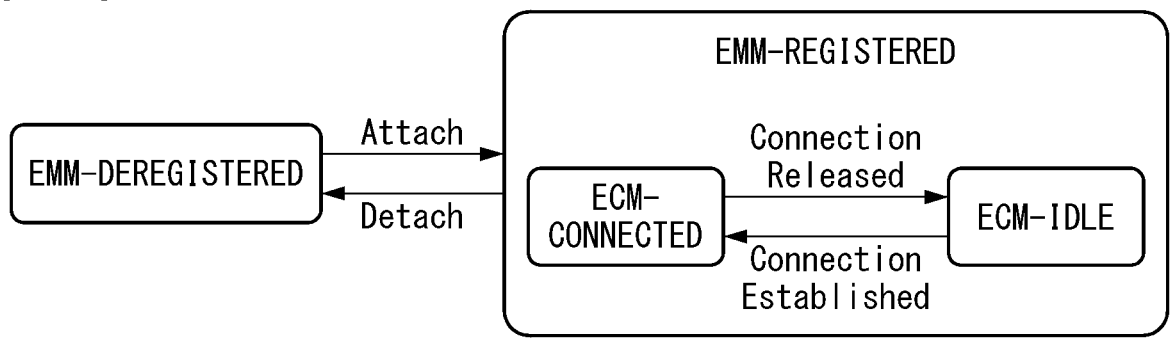
[FIG. 5]
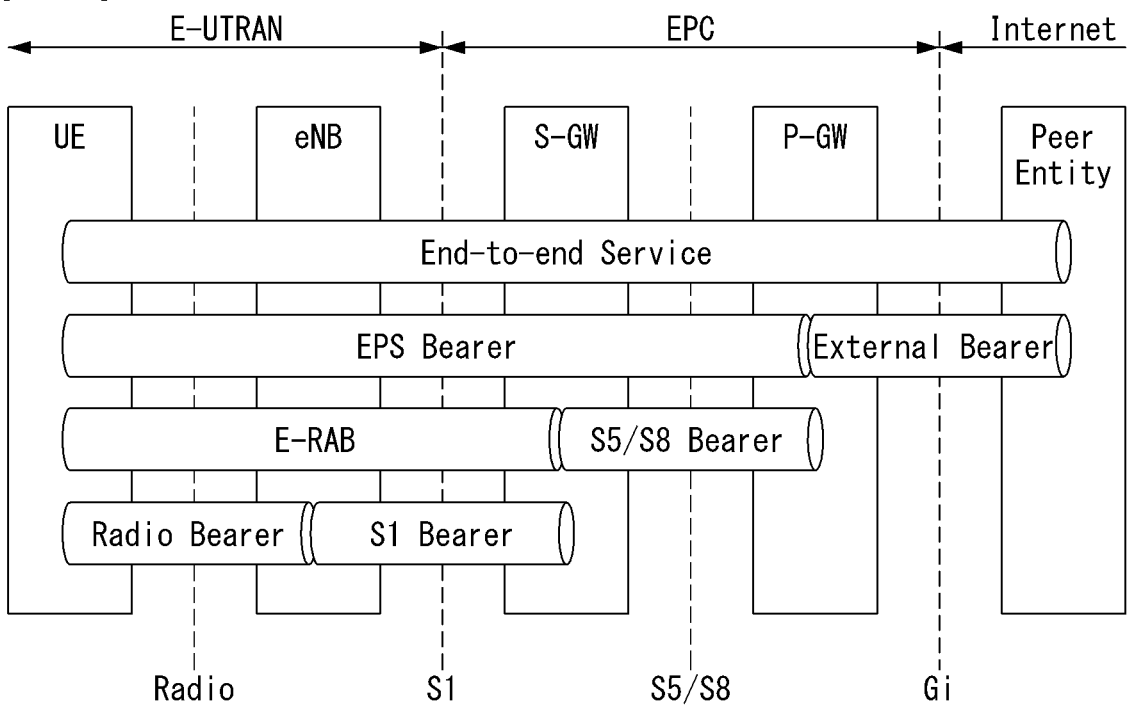

[FIG. 6]
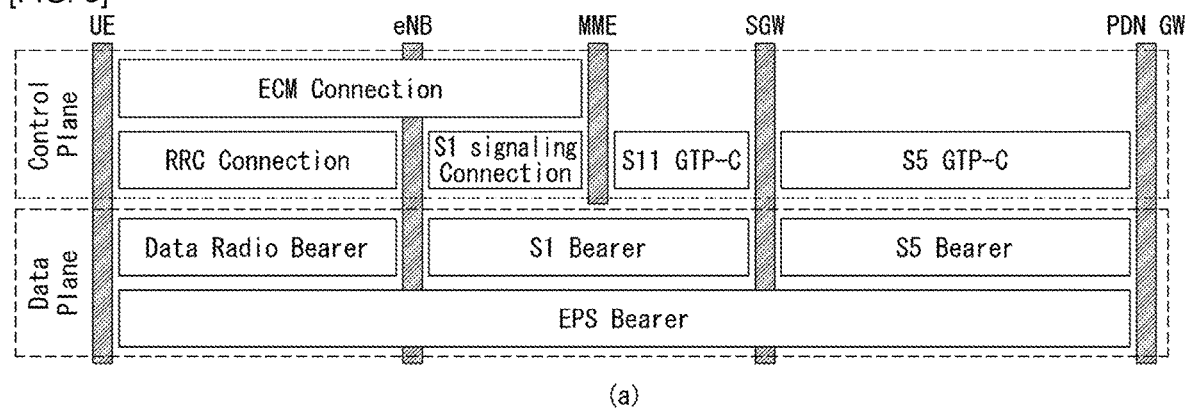
(a)
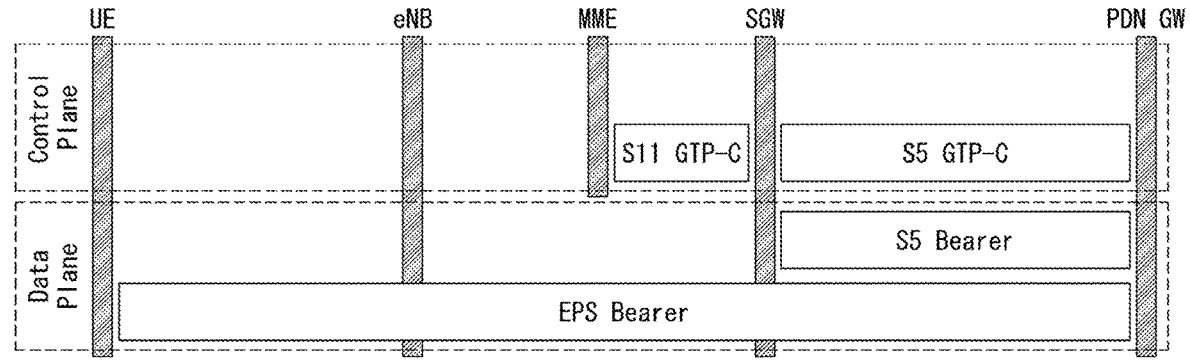
(b)

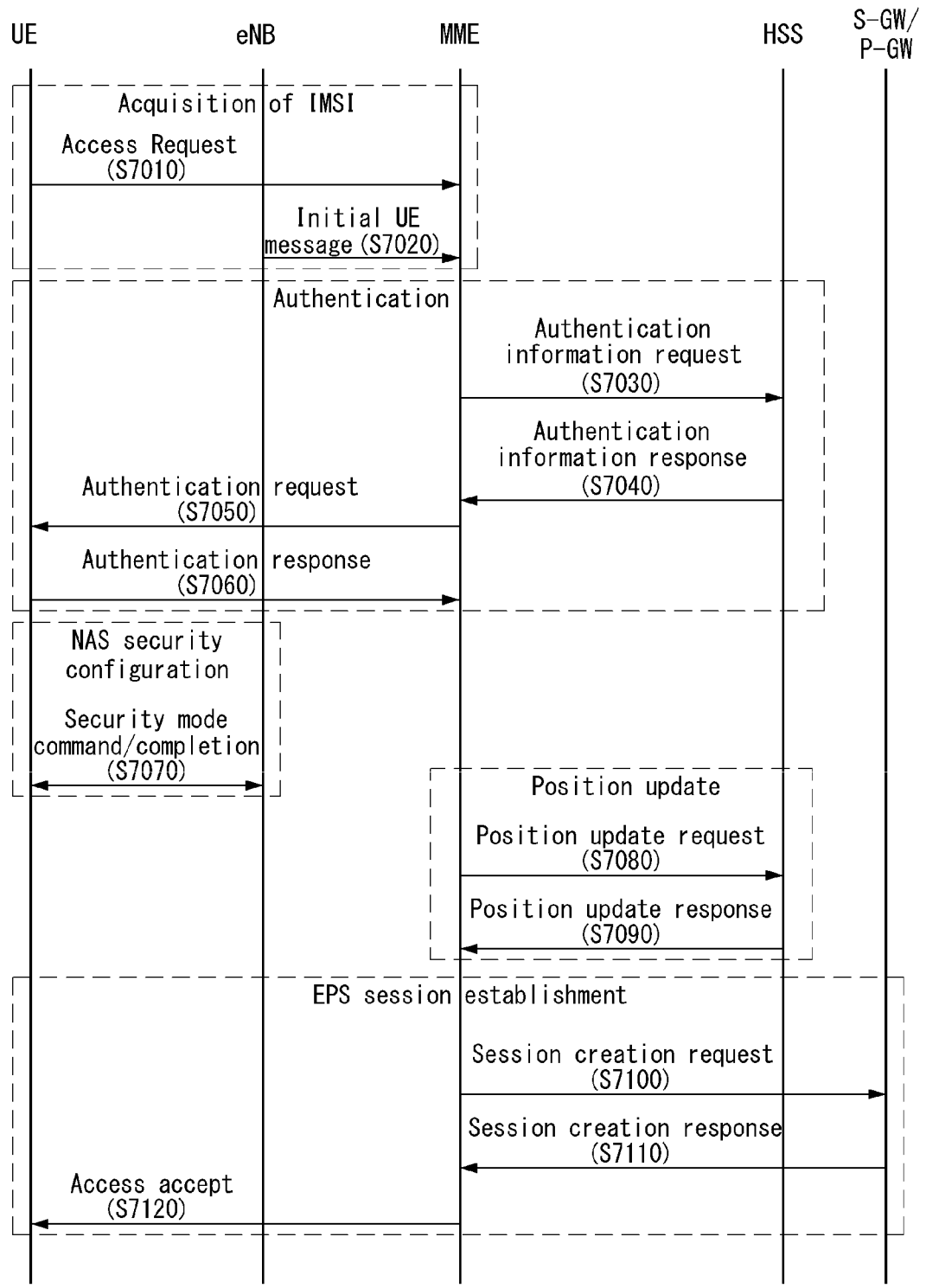

[FIG. 8]
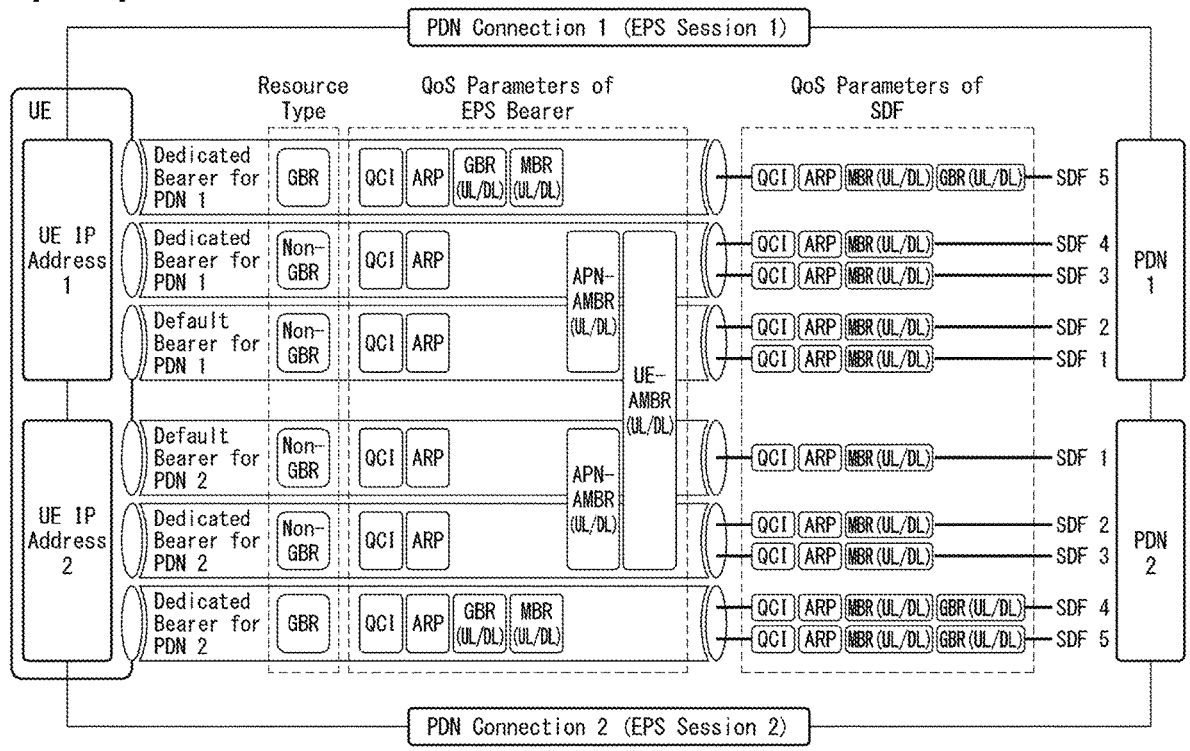

[FIG. 9]
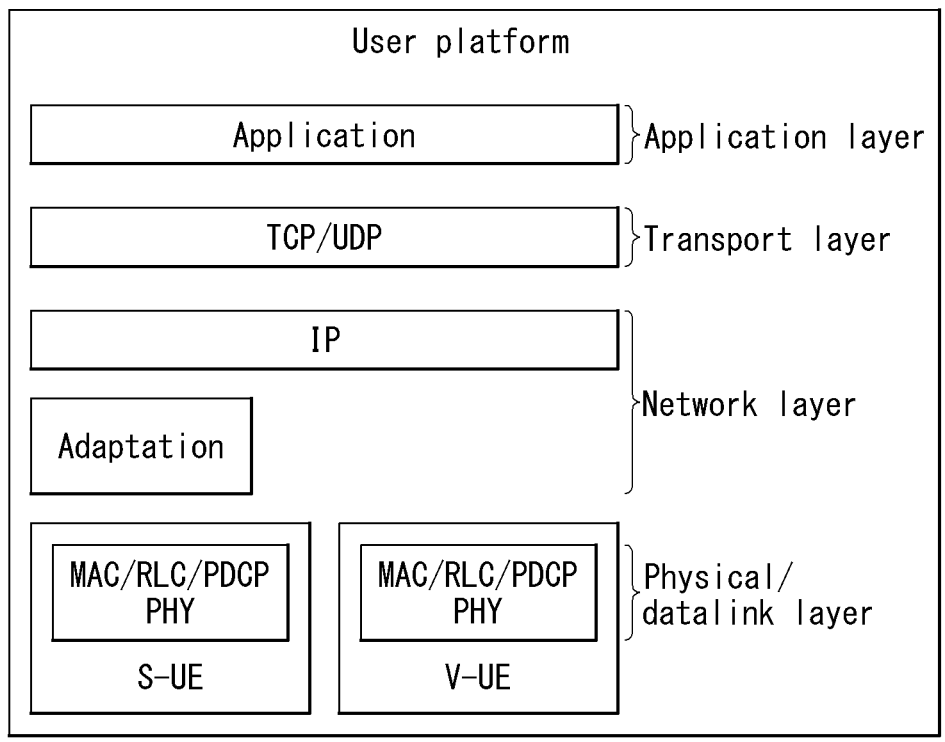
(a)
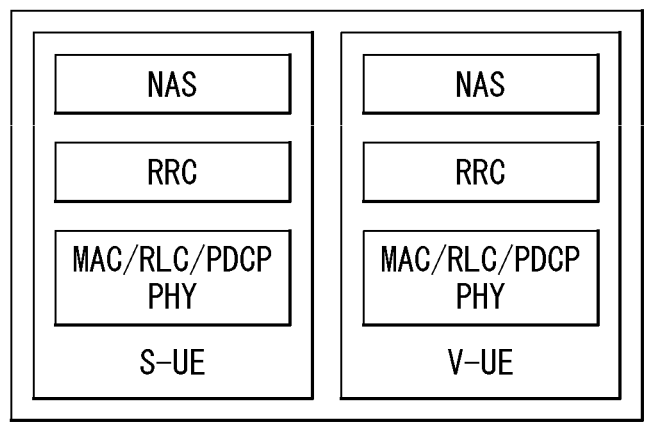
(b)

[FIG. 10]
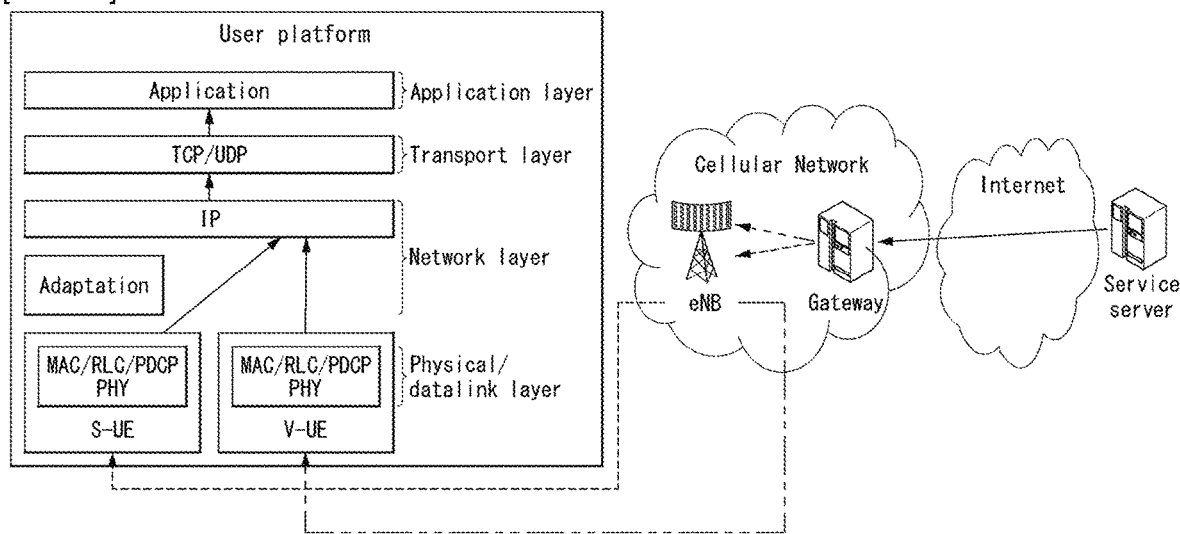

[FIG. 11]
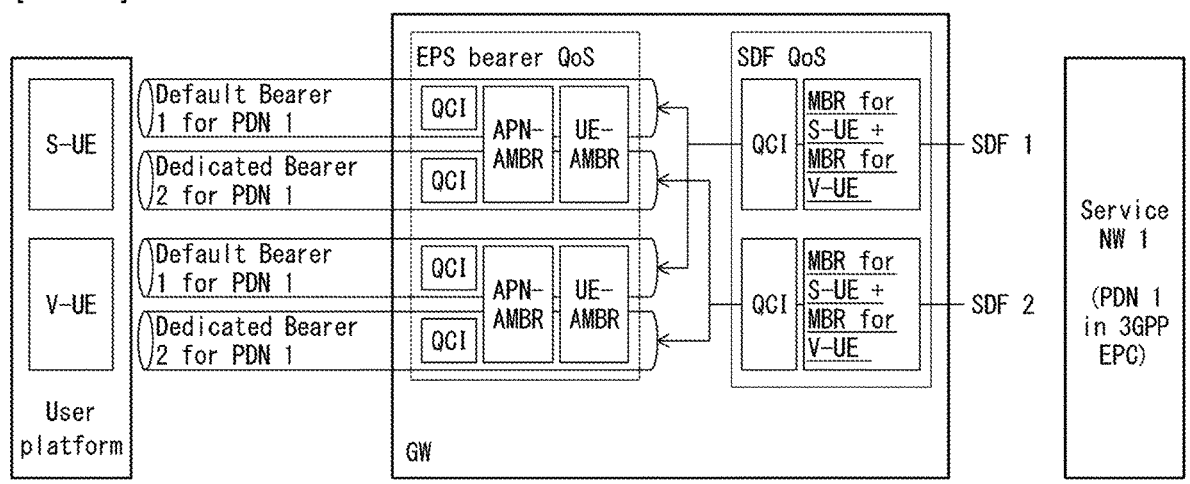

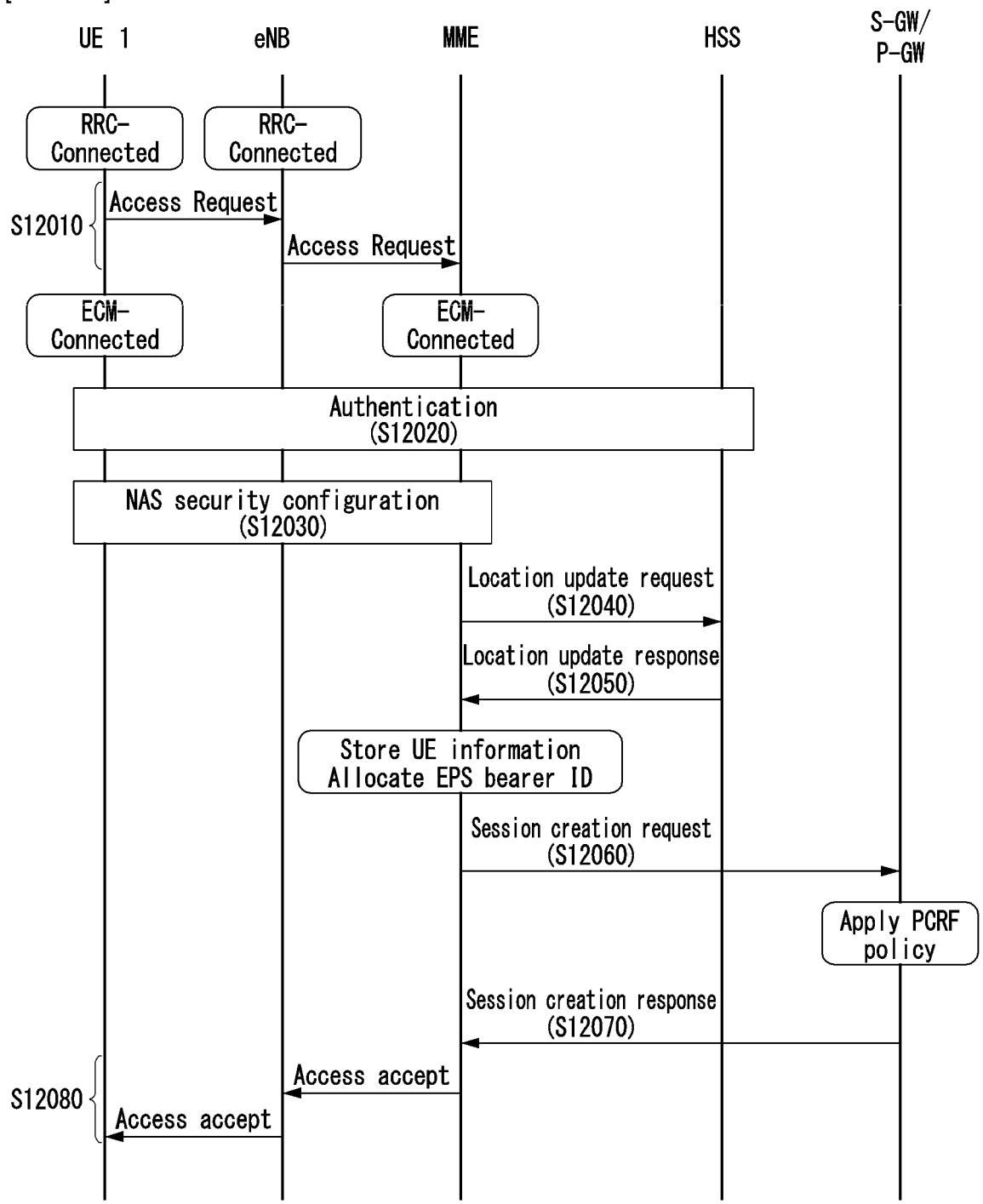

[FIG. 13]
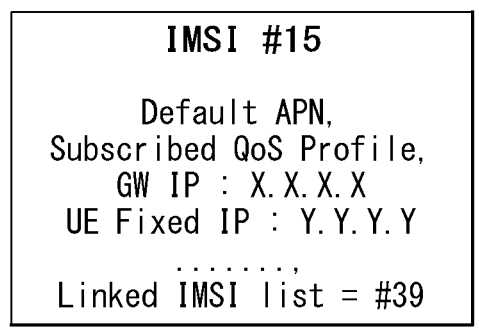
(a) Context information of UE 1
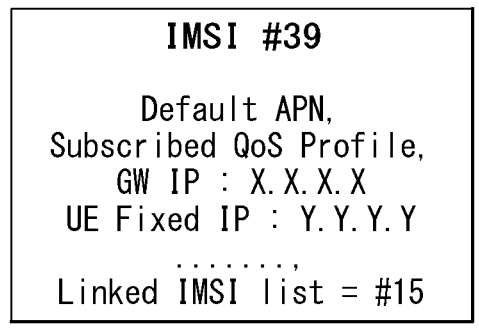
(b) Context information of UE 2

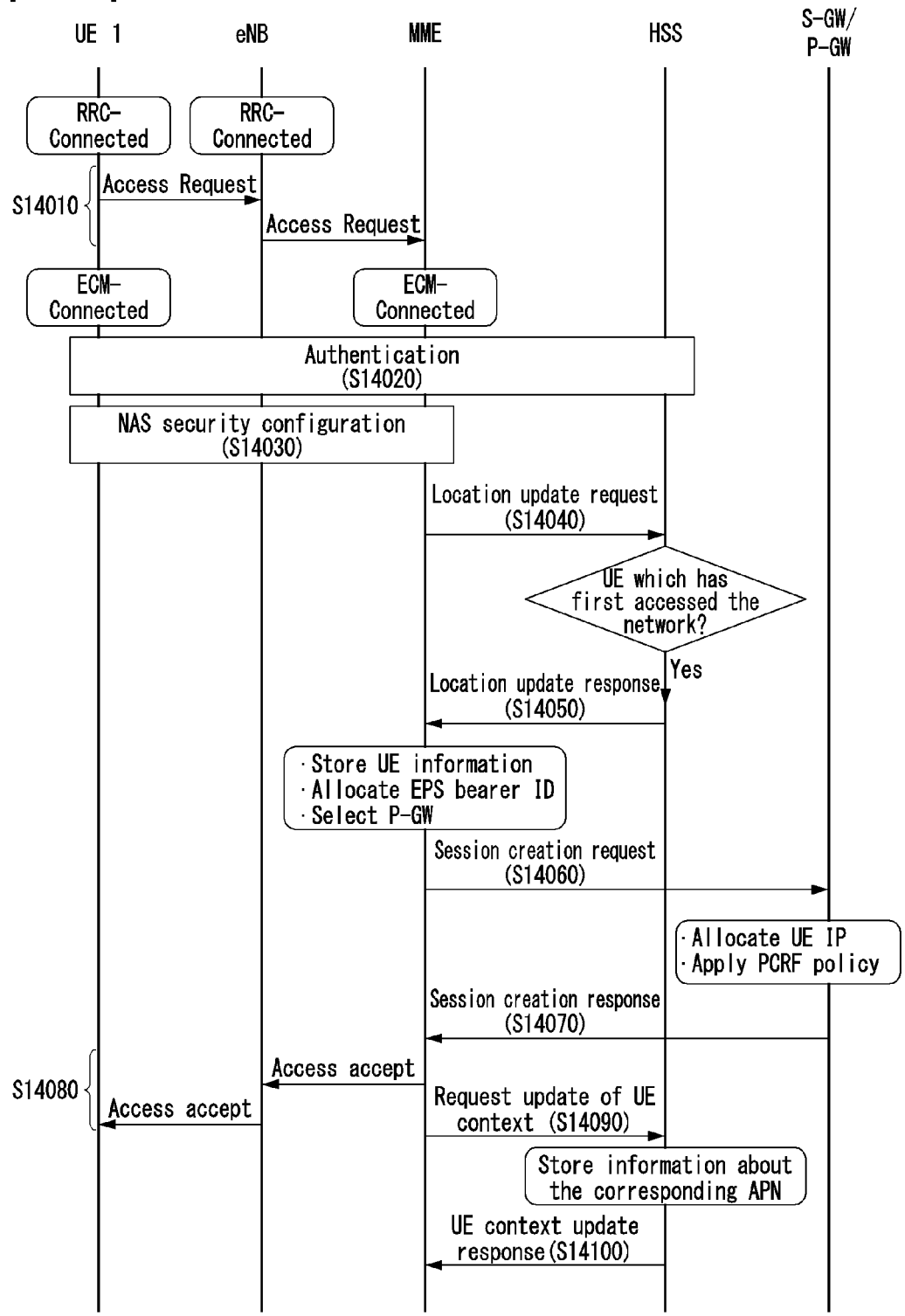
[FIG. 14]

[FIG. 15]
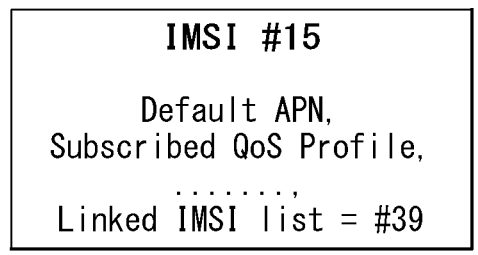
(a) Context information of UE 1
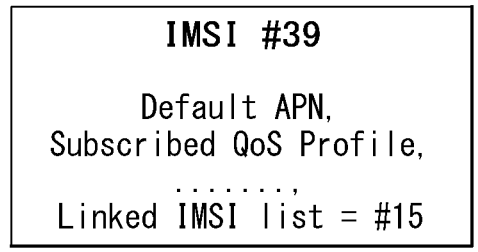
(b) Context information of UE 2

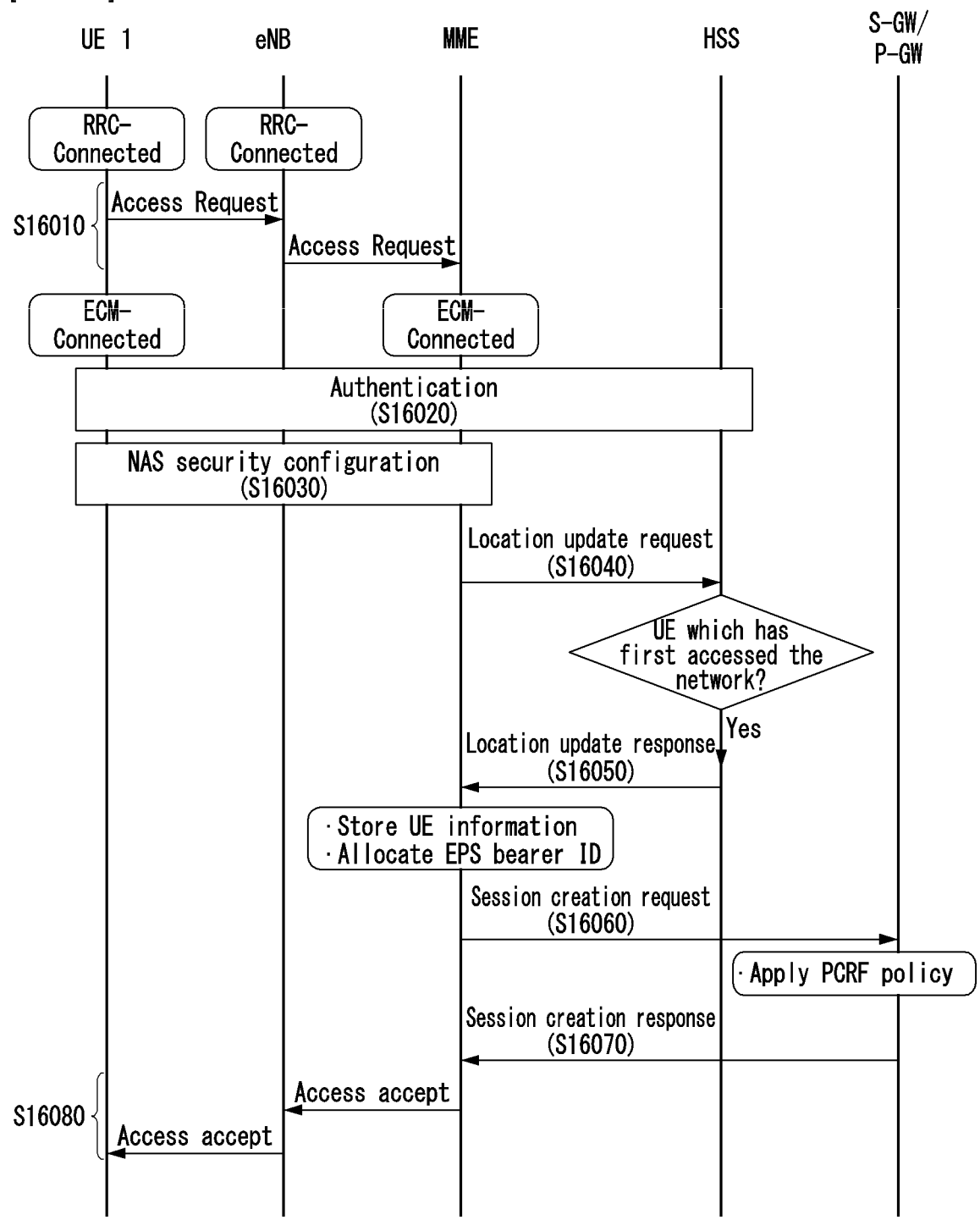
[FIG. 16]

[FIG. 17]
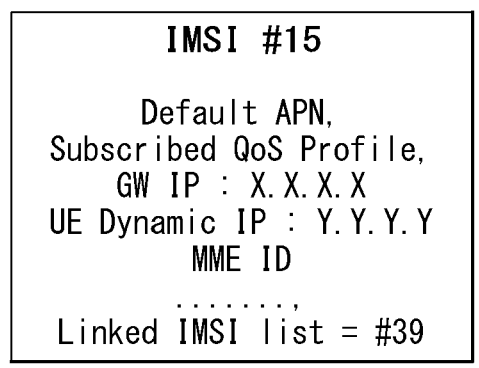
(a) Context information of UE 1
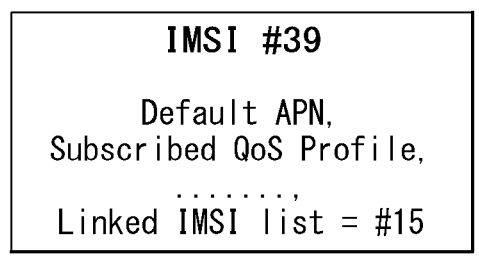
(b) Context information of UE 2

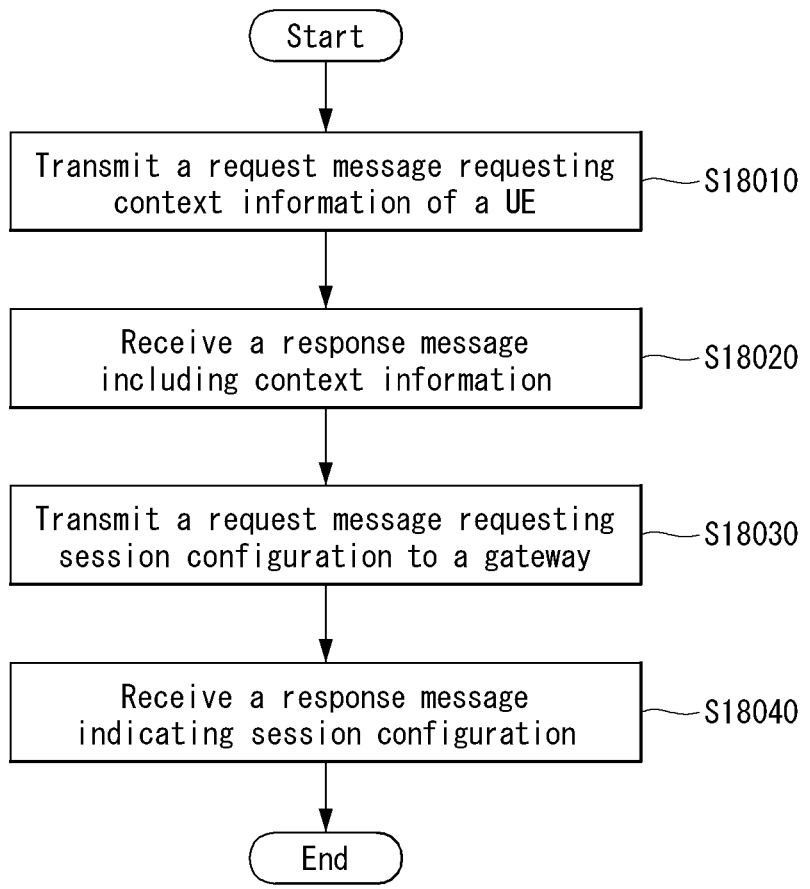
[FIG. 18]

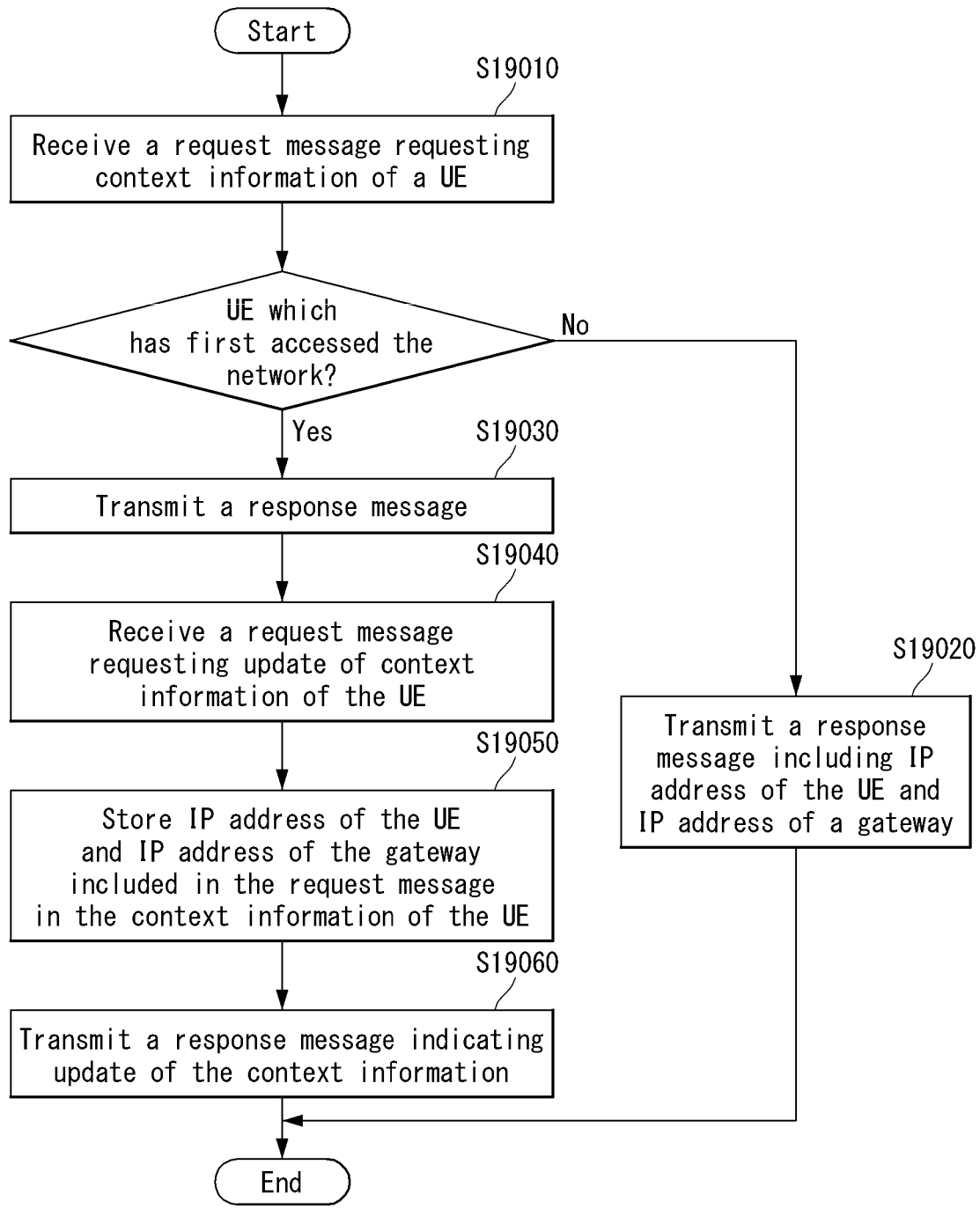
[FIG. 19]

[FIG. 20]
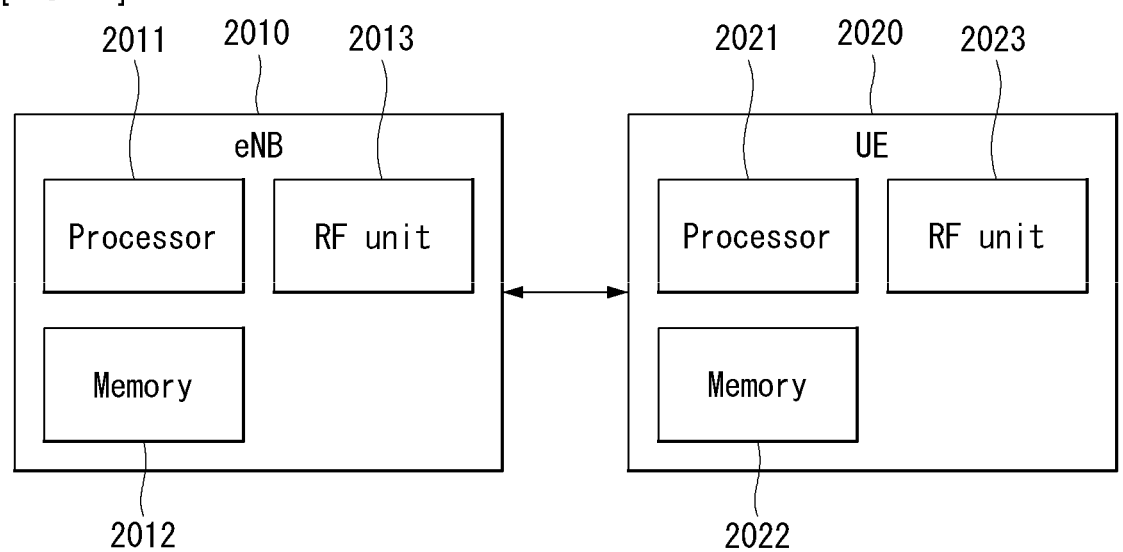

METHOD FOR TRANSRECEIVING DATA IN WIRELESS COMMUNICATION SYSTEM AND DEVICE SUPPORTING SAME

CROSS-REFERENCE TO RELATED APPLICATIONS

This application is the National Stage filing under 35 U.S.C. 371 of International Application No. PCT/KR2017/001479, filed on Feb. 10, 2017, which claims the benefit of U.S. Provisional Application No. 62/293,774, filed on Feb. 11, 2016, 62/305,541, filed on Mar. 9, 2016 and 62/351,278, filed on Jun. 16, 2016, the contents of which are all hereby incorporated by reference herein in their entirety.

TECHNICAL FIELD

The present invention relates to a method for transceiving data performed by a terminal in a wireless communication system. More specifically, the present invention relates to a method for allocating an address of a terminal for transceiving data through a plurality of terminals and a device supporting the method.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a method and a device for allocating an Internet Protocol (IP) address to a terminal for transceiving data.

Also, an object of the present invention is to provide a method and a device for transmitting a plurality of data efficiently through a plurality of linked terminals.

Also, an object of the present invention is to provide a method and a device for allocating the same IP address to a plurality of linked terminals for transmitting large-sized data efficiently.

Also, an object of the present invention is to provide a method and a device for allocating IP addresses of a plurality of linked terminals according to the information included in the context information of a terminal Also, an object of the present invention is to provide a method and a device for managing context information of a UE for allocating the same IP address to a plurality of linked terminals.

Technical objects of the present invention are not limited to the above-described object and other technical objects that have not been described above will become evident to those skilled in the art from the following description.

Technical Solution

To solve the technical problem above, the present invention provides a method and a device for transceiving data performed by a device in a wireless communication device.

More specifically, a method for transceiving data according to one embodiment of the present invention comprises transmitting a first request message requesting context information of a terminal to a home subscriber server (HSS); receiving a first response message including the context information from the HSS, wherein the context information includes at least one of an identifier for identifying a terminal, a gateway Internet Protocol (IP) address, a terminal IP address allocated to the terminal, or list information including at least one terminal identifier linked to the terminal; transmitting a second request message requesting a session configuration for transceiving data of the terminal to the gateway, wherein the second request message includes the context information; and receiving from the gateway a second response message including a session identifier indicating a session configured in response to the second request message, wherein a terminal IP address the same as that of the terminal is allocated to the at least one terminal for transceiving data with the same gateway.

Also, the method according to the present invention further comprises transmitting the context information to a third network managing the at least one terminal.

Also, the method according to the present invention further comprises receiving, from the third network, a response message including context information of the at least one terminal linked to the terminal.

Also, according to the present invention, the data is transmitted and received based on a sum of all of the maximum bit rates (MBRs) of each of the terminal and the at least one terminal.

Also, according to the present invention, the data is transmitted and received through each session based pm a Quality of Service (QoS) parameter of the session created between the terminal and the at least one terminal and the gateway.

Also, according to the present invention, the data is transmitted and received based on a maximum bit rate or an access point name-aggregate maximum bit rate (APN-AMBR) of each of the terminal and the at least one terminal.

The terminal and the at least one terminal belong to one platform.

Also, the present method provides a method comprising receiving a first request message requesting context information of a first terminal from a MME, wherein the first request message includes an identifier representing the first terminal; determining, based on the identifier, existence of a terminal attached to a network including the MME among at least one terminal linked to the first terminal; transmitting, to the MME, a first response message including list information including an identifier of at least one terminal linked to the terminal, wherein, when one of the at least one terminal is attached to the network, the first response message further includes a terminal IP address allocated to the first terminal, and a terminal IP address the same as that of the first terminal is allocated to the at least one terminal to transceive data with the same gateway.

Also, the method according to the present invention further comprises checking whether context information corresponding to the identifier includes a gateway IP address representing a gateway corresponding to a default access point name (APN) and the terminal IP address.

Also, the method according to the present invention further comprises receiving a second request message requesting update of context information of the first terminal from the MME when none of the at least one terminal is attached to the network, wherein the second request message includes a terminal IP address allocated to the first terminal and a gateway IP address representing the same gate; storing the terminal IP address and the gateway IP address in the context information; and transmitting a second response message indicating update of the context information in response to the second request message.

Also, the present invention provides a device comprising a communication unit transmitting and receiving a radio signal to and from the outside, and processor functionally linked to the communication unit, wherein the processor is configured to transmit a first request message requesting context information of a terminal to an HSS; to receive a first response message including the context information from the HSS, wherein the context information includes at least one of an identifier for identifying a terminal, a gateway IP address, a terminal IP address allocated to the terminal, or list information including at least one terminal identifier linked to the terminal; to transmit a second request message requesting a session configuration for transmitting and receiving data of the terminal to the gateway, wherein the second request message includes the context information; and to receive from the gateway a second response message including a session identifier indicating a session configured in response to the second request message, wherein a terminal IP address the same as that of the terminal is allocated to the at least one terminal to transceive data with the same gateway.

Advantageous Effects

The present invention includes information of a terminal linked to a specific terminal in the context information of the specific terminal, thereby allocating the same IP address to the linked terminal.

Also, the present invention determines whether to allocate a new IP address according to the information included in the context information of a terminal, thereby allocating an IP address to terminals in a fast and efficient way.

Also, the present invention allocates the same IP address to a plurality of linked terminals, thereby transceiving data with a plurality of terminals to provide the same service.

Also, the present invention transceives data through a plurality of linked terminals, thereby efficiently transmitting a large amount of data.

The technical effects of the present invention are not limited to the technical effects described above, and other technical effects not mentioned herein may be understood to those skilled in the art to which the present invention belongs from the description below.

BRIEF DESCRIPTION OF THE DRAWINGS

FIG. 1 shows one example of Evolved Packet System (EPS) related to a LTE system to which the present invention may be applied.

FIG. 2 is a block diagram of functional splitting between E-UTRAN and EPC to which the present invention may be applied.

FIG. 3 is a block diagram of one example of a radio protocol architecture to which technical features of the invention may be applied.

FIG. 4 illustrates EMM and ECM states in a wireless communication system to which the present invention may be applied.

FIG. 5 illustrates a bearer structure in a wireless communication system to which the present invention may be applied.

FIG. 6 illustrates a transmission path of a control plane and user plane in an EMM registered state in a wireless communication system to which the present invention may be applied.

FIG. 7 is a flow chart showing one example of an initial attach procedure in a wireless communication system to which the present invention may be applied.

FIG. 8 shows one example of parameter configuration for QoS (Quality of Service) management.

FIG. 9 is a block diagram of one example of a radio protocol architecture of a user platform to which the present invention may be applied.

FIG. 10 shows one example of a data transmission/reception method between a user platform and a base station to which the present invention may be applied.

FIG. 11 shows one example of parameter configuration for Quality of Service (QoS) management to which the present invention may be applied.

FIGS. 12 and 13 illustrate one example of a method for allocating a fixed IP address to a terminal to which the present invention is applied and context information of the terminal.

FIGS. 14 and 15 illustrate a method for allocating a dynamic IP address to a terminal to which the present invention is applied and context information of the terminal.

FIGS. 16 and 17 illustrate another example of a method for allocating a dynamic IP address to which the present invention is applied and context information of the terminal.

FIG. 18 is a flow diagram illustrating one example of an operation of an MME for allocating the same IP address to a plurality of linked terminals to which the present invention is applied.

FIG. 19 is a flow diagram illustrating one example of an operation of an HSS for allocating the same IP address to a plurality of linked terminals to which the present invention is applied.

FIG. 20 is one example of an internal block diagram of a wireless device to which the present invention may be applied.

BEST MODE

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has a meaning of a user equipment node of a network, which directly communicates with a user equipment. In some cases, a specific operation described as being performed by the base station may also be performed by an upper node of the base station. Namely, it is apparent that, in a network including a plurality of network nodes including a base station, various operations performed for communication with a user equipment may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)', and the like. The term 'user equipment" may be fixed or mobile, and may be replaced with the term 'user equipment (UE)', 'mobile station (MS)', 'user user equipment (UT)', 'mobile subscriber station (MSS)', 'subscriber station (SS)', 'advanced mobile station (AMS)', 'wireless user equipment (WT)', 'machine-type communication (MTC) device', 'machine-to-machine (M2M) device', 'device-to-device (D2D) device', and the like.

Hereinafter, the downlink (DL) means communication from a base station to a user equipment, and the uplink (UL) means communication from a user equipment to a base station. In the downlink, a transmitter may be part of a base station, and a receiver may be part of a user equipment.

In the uplink, a transmitter may be part of a user equipment, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located.

APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway.

Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update

P-TMSI: Packet Temporary Mobile Subscriber

TAU: Tracking Area Update

GBR: Guaranteed Bit Rate

GTP: GPRS Tunneling Protocol

TEID: Tunnel Endpoint ID

GUTI: Globally Unique Temporary Identity, UE identity known to an MME

FIG. 1 is a view illustrating an Evolved Packet System which is associated with the Long Term Evolution (LTE) system to which the present invention can be applied.

The LTE system aims to provide seamless Internet Protocol (11') connectivity between a user equipment (UE) 10 and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station 20, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a LTE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

FIG. 2 illustrates a functional split of an E-UTRAN and an EPC to which the present invention can be applied.

Referring to FIG. 2, a deviate crease line block indicates radio protocol layer, and an empty block indicates the functional entity of a control plane.

A base station performs the following function. (1) radio resource management (RRM) functions, such as radio bearer control, radio admission control, connection mobility control, and dynamic resource allocation to a user equipment, (2) Internet protocol (IP) header compression and the encryption of a user data stream, (3) the routing of user plane data toward an S-GW, (4) the scheduling and transmission of a paging message, (5) the scheduling and transmission of broadcast information, and (6) measurement for mobility and scheduling and a measurement report configuration.

The MME performs the following functions. (1) the distribution of a paging message to base stations, (2) security control, (3) idle state mobility control, (4) SAE bearer control, and (5) the ciphering and integrity protection of non-access stratum (NAS) signaling.

The S-GW performs the following functions. (1) the termination of a user plane packet for paging and (2) user plane switching for the support of user equipment mobility.

FIG. 3 is a block diagram showing an example of radio protocol architecture to which the technical characteristics of the present invention may be applied.

FIG. 3(a) shows an example of radio protocol architecture for a user plane, and FIG. 3(b) is a block diagram showing an example of radio protocol architecture for a control plane.

The user plane is a protocol stack for user data transmission, and the control plane is a protocol stack for control signal transmission.

Referring to FIGS. 3(a) and 3(b), a physical (PHY) layer provides information transfer service to a higher layer using a physical channel. The physical layer is connected to a medium access control (MAC) layer, that is, a higher layer, through a transport channel. Data is moved between the MAC layer and the physical layer through the transport channel. The transport channel is classified depending on how data is transmitted through a radio interface according to which characteristics.

Data is moved through a physical channel between different physical layers, that is, the physical layers of a transmitter and a receiver. The physical channel may be modulated according to an orthogonal frequency division multiplexing (OFDM) scheme, and uses time and a frequency as radio resources.

The function of the MAC layer includes mapping between a logical channel and a transport channel and multiplexing/demultiplexing (the meaning of "/" includes both the concepts of "or" and "and") to a transport block provided to a physical channel on the transport channel of an MAC service data unit (SDU) that belongs to a logical channel. The MAC layer provides service to a radio link control (RLC) layer through the logical channel.

The function of the RLC layer includes the concatenation, segmentation and reassembly of an RLC SDU. In order to guarantee various quality of services (QoS) required by a radio bearer (RB), the RLC layer provides three operating modes; a transparent mode (TM), an unacknowledged mode (UM) and an acknowledged mode (AM). AM RLC provides error correction through an automatic repeat request (ARQ).

A radio resource control (RRC) layer is defined only in the control plane. The RRC layer is related to the configuration, re-configuration and release of radio bearers and is responsible for control of the logical channel, transport channel and physical channels. An RB means a logical path provided by the first layer (PHY layer) and the second layer (MAC layer, RLC layer, and PDCP layer) for the transfer of data between a user equipment and a network.

The function of a packet data convergence protocol (PDCP) layer in the user plane includes the transfer, header compression and ciphering of user data. The function of a packet data convergence protocol (PDCP) in the control plane includes the transfer and ciphering/integrity protection of control plane data.

What an RB is configured means a process of defining the characteristics of a radio protocol layer and channel in order to provide a specific service and configuring each detailed parameter and operating method. An RB may be divided into two types of a signaling RB (SRB) and a data RB (DRB). The SRB is used as a passage for transmitting an RRC message in the control plane, and the DRB is used as a passage for transmitting user data in the user plane.

When an RRC connection is established between the RRC layer of a user equipment and the RRC layer of an E-UTRAN, the user equipment is in the RRC connected state. If not, the user equipment is in the RRC idle state.

A downlink transport channel through which a network transmits data to a user equipment includes a broadcast channel (BCH) through which system information is transmitted and a downlink shared channel (SCH) through which user traffic or a control message is transmitted. The traffic of a downlink multicast or broadcast service or a control message may be transmitted through a downlink SCH or may be transmitted through a separate downlink multicast channel (MCH). Meanwhile, an uplink the transport channel through a user equipment transmits data to a network includes a random access channel (RACH) through which an initial control message is transmitted and an uplink shared channel (SCH) through which user traffic or a control message is transmitted.

A logical channel located higher than a transport channel and mapped to the transport channel includes a broadcast control channel (BCCH), a paging control channel (PCCH), a common control channel (CCCH), a multicast control channel (MCCH), and a multicast traffic channel (MTCH).

A physical channel includes several OFDM symbols in the time domain and several subcarriers in the frequency domain. One subframe includes a plurality of OFDM symbols in the time domain. A resource block is a resource allocation unit and consists of a plurality of OFDM symbols and a plurality of subcarriers. Furthermore, each subframe may use specific subcarriers of specific OFDM symbols (e.g., first OFDM symbol) of the corresponding subframe for a physical downlink control channel (PDCCH), that is, an L1/L2 control channel. A transmission time interval (TTI) is a unit time of subframe transmission.

FIG. 4 is a diagram illustrating EMM and an ECM state in a wireless communication system to which the present invention may be applied.

Referring to FIG. 4, in order to manage the mobility of a user equipment in the NAS layer located in the control plane of the user equipment and the MME, an EMM registration state (EMM-REGISTERED) and an EMM deregistration state (EMM-DEREGISTERED) may be defined depending on whether the user equipment has been attached to or detached from a network. The EMM-REGISTERED state and the EMM-DEREGISTERED state may be applied to the user equipment and the MME.

At the initial stage, such as a case where a user equipment is first powered on, the user equipment is in the EMM-DEREGISTERED state. In order to access the network, the user equipment performs a process of registering with the corresponding network through an initial attach procedure. When the connection procedure is successfully performed, the user equipment and the MME make transition to the EMM-REGISTERED state. Furthermore, if the user equipment is powered off or a radio link fails (if a packet error rate exceeds a reference value on the radio link), the user equipment is detached from the network and makes transition to the EMM-DEREGISTERED state.

Furthermore, in order to manage a signaling connection between the user equipment and the network, an ECM connected state (ECM-CONNECTED) and an ECM idle state (ECM-IDLE) may be defined. The ECM-CONNECTED state and the ECM-IDLE state may also be applied to the user equipment and the MME.

An RRC state indicates whether the RRC layer of a user equipment and the RRC layer of a base station have been logically connected. That is, if the RRC layer of the user equipment and the RRC layer of the base station are connected, the user equipment is in the RRC connected state (RRC_CONNECTED). If the RRC layer of the user equipment and the RRC layer of the base station are not connected, the user equipment is in the RRC idle state (RRC_IDLE).

Case when ECM State is Associated with RRC State

The ECM connection includes an RRC connection established between the user equipment and the base station and an S1 signaling connection established between the base station and the MME. In other words, enabling/disabling the ECM connection means that both RRC connection and S1 signaling connection are enabled/disabled.

The network may determine the presence of user equipment in the ECM-CONNECTED & RRC-CONNECTED state on a cell-by-cell basis and may effectively control the user equipment.

In contrast, the network cannot check the presence of the user equipment in the ECM-IDLE state, and a core network (CN) manages the user equipment in a tracking area unit, that is, an area unit larger than a cell. When the user equipment is in the ECM idle state, the user equipment performs discontinuous reception (DRX) configured by NAS using an ID uniquely allocated in a tracking area. That is, the user equipment may receive the broadcasting of system information and paging information by monitoring a paging signal at a specific paging occasion every user equipment-specific paging DRX cycle.

Furthermore, when the user equipment is in the ECM-IDLE state, the network does not have context information of the user equipment. Accordingly, the user equipment in the ECM-IDLE state may perform a user equipment-based mobility-related procedure, such as cell selection or cell reselection, without a need to receive a command from the network. If the location of the user equipment in the ECM idle state is different from that known to the network, the user equipment may notify the network of the location of the corresponding user equipment through a tracking area update (TAU) procedure.

In contrast, when the user equipment is in the ECM-CONNECTED & RRC-CONNECTED state, the mobility of the user equipment is managed by a command from the network. In the ECM-CONNECTED state, the network is aware of a cell to which the user equipment belongs. Accordingly, the network may transmit and/or receive data to the user equipment or from the user equipment, may control mobility, such as handover of the user equipment, and may perform cell measurement for a neighboring cell.

As described above, in order for a user equipment to receive a common mobile communication service such as voice or data, the user equipment must shift to the ECM-CONNECTED & RRC-CONNECTED state. At the initial stage, such as a case where the user equipment is first powered on, the user equipment is in the ECM-IDLE state like the EMM state. When the user equipment is successfully registered with a corresponding network through an initial attach procedure, the user equipment and an MME make transition to the ECM connected state. Furthermore, if the user equipment has been registered with the network, but a radio resource has not been allocated because traffic has been deactivated, the user equipment is in the ECM-IDLE state. When uplink or downlink new traffic is generated in the corresponding user equipment, the user equipment and the MME make transition to the ECM-CONNECTED state through a service request procedure.

Case when ECM State is not Associated with RRC State

The ECM connection includes the RRC connection established between the user equipment and the base station and the S1 signaling connection established between the base station and the MME, but may be independent of the RRC state. That is, the ECM state between the user equipment and the MME may maintain the connected state even when the RRC state transitions from the connected state to the idle state.

Operations of the network/base station and user equipment in ECM-CONNECTED & RRC-CONNECTED state and ECM-IDLE state may be the same as operations in case when ECM state is associated with RRC state.

The network in the ECM-CONNECTED & RRC-IDLE state may perform the same operation as the operation in the ECM-CONNECTED state, but may manage the mobility of the user equipment in a specific unit including the base station and user equipment and may re-establish a connection (for example, S1 signaling connection, S1 data connection) path with MME/S-GW.

Therefore, the user equipment may perform different operations according to its state as follows.

ECM-IDLE: message transmission for ECM and RRC connection state transition

ECM-CONNECTED & RRC-IDLE (excluding RRC-IDLE of the user equipment due to radio link failure): message transmission for resuming RRC connection state transition and connection recommence ECM-CONNECTED & RRC-IDLE (RRC-IDLE of the user equipment due to radio link failure): message transmission for RRC connection re-establishment.

FIG. 5 is a diagram illustrating a bearer structure in a wireless communication system to which the present invention may be applied.

When a UE is connected to a Packet Date Network (PDN), a PDN connection is generated, and the PDN connection may also be called an EPS session. A PDN is an internet protocol network which is exterior or interior of a service provider, and provides a service function such as an internet or IP Multimedia Subsystem (IMS).

The EPS session has one or more EPS bearer. The EPS bearer is the transmission path of traffic generated between a user equipment and a PDN GW in order for the EPS to transfer user traffic. One or more EPS bearers may be configured per user equipment.

Each EPS bearer may be divided into an E-UTRAN radio access bearer (E-RAB) and an S5/S8 bearer. The E-RAB may be divided into a radio bearer (RB) and an S1 bearer. That is, the EPS bearers correspond to the RB, S1 bearer, and S5/S8 bearer, respectively.

The E-RAB transfers the packet of an EPS bearer between a user equipment and an EPC. If the E-RAB is present, the E-RAB bearer and the EPS bearer are mapped in a one-to-one manner. A data radio bearer (DRB) transfers the packet of the EPS bearer between the user equipment and an eNB. If the DRB is present, the DRB and the EPS bearer/E-RAB are mapped in a one-to-one manner. The S1 bearer transfers the packet of the EPS bearer between the eNB and the S-GW. The S5/S8 bearer transfers an EPS bearer packet between the S-GW and the P-GW.

The user equipment binds a service data flow (SDF) to the EPS bearer of an uplink direction. The SDF is an IP flow or a gathering of IP flows in which user traffic has been classified (or filtered) for each service. A plurality of SDFs may be multiplexed with the same EPS bearer by including a plurality of uplink packet filters. The user equipment stores mapping information between an uplink packet filter and a DRB in order to bind the SDF and the DRB in the uplink.

The P-GW binds the SDF to the EPS bearer in a downlink direction. The plurality of SDFs may be multiplexed with the same EPS bearer by including a plurality of downlink packet filters. The P-GW stores mapping information between the downlink packet filters and the S5/S8 bearer in order to bind the SDF and the S5/S8 bearer in the downlink.

The eNB stores one-to-one mapping between the DRB and the S1 bearer in order to bind the DRB and the S1 bearer in the uplink/downlink. The S-GW stores one-to-one mapping information between the S1 bearer and the S5/S8 bearer in order to bind the S1 bearer and the S5/S8 bearer in the uplink/downlink.

The EPS bearer is divided into two types of a default bearer and a dedicated bearer. A user equipment may have one default bearer or one or more dedicated bearers per PDN. The least default bearer having an EPS session with respect to one PDN is called a default bearer.

The EPS bearer may be classified based on an identity. The EPS bearer identity is allocated by a user equipment or an MME. The dedicated bearer(s) is combined with a default bearer by a linked EPS bearer identity (LBI).

When a user equipment is initially attached to a network through an initial attach procedure, it receives an IP address allocated thereto and thus a PDN connection is generated. A default bearer is generated at the EPS interval. The default bearer is maintained without being released unless the PDN connection with the user equipment is terminated although there is no traffic between the user equipment and a corresponding PDN. When the corresponding PDN connection is terminated, the default bearer is also released. In this case, all of bearers in the interval forming a default bearer with the user equipment are not activated, but an S5 bearer having a direct connection with the PDN is maintained and E-RAB bearers (i.e., DRB and S1 bearer) associated with a radio resource are released. Furthermore, when new traffic is generated in the corresponding PDN, an E-RAB bearer is reconfigured to transfer traffic.

While a user equipment uses a service (e.g., Internet) through a default bearer, if the user equipment uses a service (e.g., video on demand (VoD)) insufficient to receive quality of service (QoS) using only the default bearer, a dedicated bearer when the user equipment demands the dedicated bearer. If there is no traffic of the user equipment, the dedicated bearer is released. A user equipment or a network may generate a plurality of dedicated bearers, if necessary.

An IP flow may have a different QoS characteristic depending on that a user equipment uses which service. When a network establishes/modifies an EPS session for the user equipment, it determines a control policy for the allocation of a network resource to QoS and applies it while the EPS session is maintained. This is called policy and charging control (PCC). A PCC rule is determined based on an operator policy (e.g., QoS policy, a gate status and a billing method).

The PCC rule is determined in an SDF unit. That is, an IP flow may have a different QoS characteristic depending on a service used by a user equipment. IP flows having the same QoS are mapped to the same SDF, and the SDF becomes a unit in which the PCC rule is applied.

A policy and charging control function (PCR) and a policy and charging enforcement function (PCEF) may correspond to main entities that perform such a PCC function.

The PCRF determines a PCC rule for each SDF when an EPS session is generated or changed and provides it to a P-GW (or PCEF). The P-GW configures the PCC rule for a corresponding SDF, detects an SDF every transmitted/received IP packet, and applies the PCC rule for the corresponding SDF. When the SDF is transmitted to a user equipment via the EPS, it is mapped to an EPS bearer capable of providing proper QoS according to a QoS rule stored in the P-GW.

The PCC rule is divided into a dynamic PCC rule and a pre-defined PCC rule. The dynamic PCC rule is dynamically provided from the PCRF to the P-GW when the EPS session is established/modified. In contrast, the pre-defined PCC rule is previously configured in the P-GW and activated/deactivated by the PCRF.

An EPS bearer is a basic QoS parameter and includes a QoS class identifier (QCI) and an allocation and retention priority (ARP).

The QCI is a scalar used as a criterion for accessing node-specific parameters that controls bearer level packet forwarding treatment. A scalar value is pre-configured by a network operator. For example, the scalar may be pre-configured as one of integer values 1 to 9.

A main object of an ARP is for determining whether the establishment or modification request of a bearer has to be accepted or rejected if a resource is restricted. Furthermore, the ARP may be used to determine whether which bearer(s) has to be dropped by an eNB in an exceptional resource restriction (e.g., handover) situation.

The EPS bearer is divided into a guaranteed bit rate (GBR) type bearer and a non-guaranteed bit rate (non-GBR) bearer according to a QCI resource form. A default bearer may be always a non-GBR type bearer, and a dedicated bearer may be a GBR type or non-GBR type bearer.

The GBR type bearer is a QoS parameter other than the QCI and the ARP and has the GBR and a maximum bit rate (MBR). The MBR means that a resource fixed for each bearer is allocated (guarantee a bandwidth). In contrast, the non-GBR type bearer is a QoS parameter other than the QCI and the ARP and has an aggregated MBR (AMBR). The AMBR means that a maximum bandwidth capable of being used along with another non-GBR type bearer is allocated without allocating a resource for a bearer.

If the QoS of the EPS bearer is determined as described above, the QoS of each bearer is determined for each interface. The bearer of each interface provides the QoS of the EPS bearer for each interface, and thus all of the EPS bearer, an RB, and S1 bearer have a one-to-one relation.

While a user equipment uses a service through a default bearer, if the user equipment uses a service incapable of receiving QoS using only the default bearer, a dedicated bearer is generated in response (on-demand) to a request from the user equipment.

FIG. 6 is a diagram illustrating the transmission path of a control plane and a user plane in an EMM registration state in a wireless communication system to which the present invention may be applied.

FIG. 6(*a*) illustrates an ECM-CONNECTED state, and FIG. 16(*b*) illustrates ECM-IDLE.

When a user equipment becomes the EMM-Registered state by successfully attaching to a network, it is provided with a service using an EPS bearer. As described above, the EPS bearer is divided into a DRB, an S1 bearer, and an S5 bearer for each interval.

As in FIG. 6(a), in the ECM-CONNECTED state having user traffic, an NAS signaling connection, that is, an ECM connection (i.e., RRC connection and S1 signaling connection), is established. Furthermore, an S11 GPRS tunneling protocol control plane (GTP-C) connection is established between the MME and SGW, and an S5 GTP-C connection is established between the SGW and the PDN GW.

Furthermore, in the ECM-CONNECTED state, all of the DRB, the S1 bearer and the S5 bearer are configured (i.e., radio or network resource allocation).

As in FIG. 6(b), in the ECM-IDLE state not having user traffic, the ECM connection (i.e., RRC connection and S1 signaling connection) is released. In this case, the establishment of the S11 GTP-C connection between the MME and the SGW and the establishment of the S5 GTP-C connection between the SGW and the PDN GW are maintained.

Furthermore, in the ECM-IDLE state, both the DRB and the S1 bearer are released, but the configuration (i.e., radio or network resource allocation) of the S5 bearer is maintained.

FIG. 7 is a flow chart showing one example of an initial attach procedure in a wireless communication system where the present invention may be applied.

As shown in FIG. 7, the initial access procedure may mainly include following 5 steps: (1) Acquisition of IMSI, (2) authentication, (3) NAS security setup, (4) location update and (5) (EPS Session Establishment.

MSI Acquisition (Acquisition of IMSI)

This procedure is the procedure by which the LTE network (MME) acquires the IMSI value of the user equipment. The user equipment transmits its IMSI to the MME via the base station using an attach request message (S7010). User equipment once attached to the network may be allocated GUTIs from the LTE network. Then, upon re-attach, the UE may transmit a GUTI instead of the IMSI to the MME.

The base station transmits, to the MME, an initial UE message including the Cell ID (ECGI) attached by the user equipment and TAI information indicating a tracking area in which the user equipment is present (S7020).

Authentication

When acquiring the IMSI value of the user equipment, MME transmits to the HSS an authentication information request message for requesting authentication information (authentication vector: AV) in order to authenticate the user equipment (S7030).

The HSS creates the AV for the user equipment, and transmits an authentication information response message including the created AV to the MME (S7040). AV may include RAND, AUTN,)(RES, KASME.

Upon receiving the AV from the HSS, the MME prepares for authenticating the user equipment. The MME may send an authentication request message including a portion (for example, RAN, AUTN, etc.) of the AV information received from the HSS to the user equipment (S7050).

The user equipment compares the AUTN value included in the received authentication request message with the AUTN created by the user equipment. If the values are the same, the UE authenticates the corresponding LTE network.

After the user equipment authenticates the LTE network, the user equipment transmits an authentication response message including the RES value created by the UE to the MME. In response, the MME authenticates the user equipment by comparing the XRES transmitted from the HSS with the RES transmitted from the user equipment.

NAS Security Setup or Establishment

The user equipment is authenticated via the authentication procedure. In step S7070, the UE performs a security establishment procedure by transmission/reception of a security mode command/complete message to securely transfer the NAS message (message between the user equipment and the MME) in the wireless section. When the NAS security establishment procedure is terminated, the NAS message is securely transmitted/received in the wireless section.

Location Update

The MME transmits an Update Location Request message including the IMSI and MME ID of the user equipment to inform the HSS of an IMSI value of the user equipment attached to the network (S7080). The HSS stores or registers the transmitted information.

The HSS transmits to the MME an Update Location Answer message including the service profile (QoS Profile) corresponding to the IMSI of the attached user equipment (S7090).

The response message includes an IMSI of the user equipment, a subscribed APN (Access Point Name), a subscribed P-GW ID, and a subscribed QoS profile, the subscribed QoS profile may include QCI, ARP, APN-AMBE (UL/DL), and UE-AMBR (UL/DL).

EPS Session Establishment

The MME transmits a Create Session Request message to the S-GW to create an EPS Session (EPS Bearer) based on the service profile transmitted from the HSS. The S-GW transmits the Create Session Request message to the P-GW (S7100). The session creation request message includes an IMSI of the user equipment, and the subscribed QoS profile transmitted from the HSS.

The P-GW allocates the IP address to be used by the user equipment. The P-GW transmits the transmitted subscribed QoS Profile to the PPCRF and requests the QoS Profile to be used last by the user equipment.

The PCRF requests an access profile (Access Profile) for the IMSI to the SPR. The SPR transmits the value to the PCRF.

The PCRF determines a last QoS profile to be used by the user equipment using the subscribed QoS profile transmitted from the P-GW and the access profile transmitted from the SPR, and transmits the determined last QoS profile to the P-GW.

The P-GW creates the EPS Bearer (GTP tunnel) based on the last QoS profile transmitted from the PCRF.

The P-GW creates an EPS Bearer. Then, the P-GW transmits a Session Create Response message including the last QoS profile to the S-GW.

The S-GW also creates the EPS Bearer (GTP tunnel) based on the last QoS profile transmitted from the P-GW. The S-GW transmits a session creation response message including the last QoS profile to the MME (S7110).

The MME transmits an Attach Accept message including the IP address to be used by the user equipment and the last QoS profile to the user equipment (S7120).

The user equipment then performs the AS security establishment procedure to protect the control signal and user data in the wireless section with the base station, and performs a DRB tunnel creation procedure to create the DRB tunnel.

When the initial access procedure as described above is completed, the EPS Bearer creation is completed. Then, the user equipment may use services such as the Internet via the base station, S-GW and P-GW.

FIG. 8 shows one example of parameter configuration for QoS (Quality of Service) management.

Referring to FIG. 8, the wireless communication system applies QoS policy on the SDF (Service Data Flow) basis and on the EPS bearer basis. The SDF (Service Data Flow) includes one or more IP flows as classified based on the service type. The EPS bearer acts as a logical path along which one or more SDFs are transmitted. That is, the QoS of the data to be transmitted/received may be managed by the following QoS parameters.

Resource type: bandwidth guaranteed type and non-guaranteed type

Guaranteed bit rate (GBR): Guaranteed minimum bandwidth

Maximum bit rate (MBR): Maximum bandwidth as allowed

Access point name-Aggregate Maximum Bit Rate (APN-AMBR): Maximum bandwidth allowed per APN UE-AMBR: maximum bandwidth allowed per user equipment When a packet inflows in a manner exceeding the bandwidth specified in the MBR, APN-AMBR, and UE-AMBR QoS parameters, each entity mentioned below discards overflowed packets.

Rate policing for downlink data

First: the P-GW discards a quantity of the incoming packets in excess of the MBR for each SDF.

Second: the P-GW discards a quantity of packets in excess of the MBR for one or more SDFs which have been introduced into each GBR EPS bearer and discards a quantity of packets exceeding the APN-AMBR for one or more SDFs which have been introduced into all non-GBR EPS bearers.

Third: the base station discards a quantity of packets exceeding the UE-AMBR for one or more SDFs that have been introduced into all No-GBR EPS bearers.

Rate policing for uplink data

First: the user equipment discards a quantity of packets in excess of MBR (GBR) and APN-AMBR (Non-GBR).

Second: The base station discards a quantity of packets in excess of MBR (GBR) and UE-AMBR (Non-GBR).

Third: the P-GW discards a quantity of packets in excess of the APN-AMBR for one or more SDFs which have been introduced in all Non-GBR EPS bearers and discards a quantity of packets in excess of the MBR for each SDF.

The QoS parameters as described above may be applied to each of the user equipments. In this way, the amount of packets in excess of the QoS parameters that may be applied to each user equipment are discarded. Further, there is a limit in improvement of the data transmission rate of each user equipment using QoS parameters of each user equipment.

Thus, to solve the problem in accordance with the present invention, a data boosting control method is provided in which a service is received from the same gateway using a number of communication devices included in one wireless device.

The data boosting method described herein may be interpreted as a method of increasing the data transmission rate by receiving a service using one or more communication devices included in one wireless device.

The communication devices included in the wireless device share a specific layer of the wireless device, as described below.

FIG. 9 is a block diagram of one example of a radio protocol architecture for a wireless device to which the present invention may be applied.

A wireless device as described herein may also refer to a user platform that includes one or more communication devices.

The communication device may also refer to a communication modem itself, which may be implemented to communicate with externals. Alternatively, the communication device may refer to a device including the communication modem.

That is, the wireless device may refer to a device that includes communication devices with the same or different Radio Access Technologies (RATs).

Thus, the communication device may be exchanged with a wireless user equipment, a communication modem, or the like.

Further, the wireless device may refer to a UE defined in 3GPP. However, it may be desirable for the wireless device to be interpreted beyond the UE defined in 3GPP. That is, the wireless device may be a vehicle, and so on in one example.

Further, the communication device may include a first communication device and one or more second communication devices.

The first communication device may refer to a communication device in the same user platform that first accesses the network. The first communication device may be referred to as a master user equipment, a special user equipment, a primary user equipment, or a first user equipment.

Hereinafter, the first communication device will be abbreviated as a S (special)-UE.

Further, the second communication device refers to a communication device that subsequently (or after the access of the first communication device) accesses the network. The second communication device may be referred to as slave user equipment, virtual user equipment, secondary user equipment, second user equipment, or the like.

Hereinafter, the second communication device will be abbreviated as a V (Virtual)-UE.

That is, the second communication device means a communication device that additionally accesses the network when the S-UE is already present in the same user platform.

Further, the communication devices within the user platform may share an application layer, a transmission layer and a network layer, as shown in FIG. 9(*a*).

At this time, when the user platform transmits uplink data to the base station using multiple communication devices, adaptation in the network layer plays a role in determining which communication device transmits the uplink data. That is, the adaptation determines a routing path for the uplink data.

Further, each communication device may individually include an NAS layer, an RRC layer, a MAC layer, an RLC layer, a PDCP layer and a PHY layer, as shown in FIG. 9(*b*).

The layers that constitute the user platform may be physically located at the same location or in a distributed manner.

At this time, when the S-UE transitions to the idle state, one V-UE among the V-UEs may act as an S-UE.

When, as described above, a plurality of communication devices are included in one user platform, each communication device may individually access the network to transmit/receive data.

Here, the majority of communication devices may use the same RAT or different RATs.

However, since the communication devices in the user platform are allocated different IP addresses, the communication devices may not receive the same service from the same gateway.

Thus, even when the user platform includes the multiple communication devices, the user platform may not exceed a maximum data transmission rate based on the QoS parameter of each communication device.

Therefore, in the following, there is disclosed a method for allocating the same IP address to the communication devices in the same user platform, thereby to increase the data transmission rate using the plurality of communication devices. That is, a data boosting method will be described.

FIG. 10 shows one example of a data transmission/reception method between a user platform and a base station to which the present invention may be applied.

In FIG. 10, it may be assumed that the S-UE and V-UE are allocated the same IP address.

A service server transmits data related to a service provided by the service server to a gateway of a cellular network over the Internet network.

The cellular network may include the base station, and the gateway.

The gateway may include at least one of the S-GW or P-GW.

The gateway transmits to the base station the downlink data to be transmitted to the communication device in the user platform. Then, the base station transmits the received downlink data to at least one communication device of the user platform.

At this time, since the S-UE and the V-UE have the same IP address, the user platform may receive the downlink data from the gateway using the two UEs (S-UE, V-UE) included in the user platform rather than using only one UE.

The downlink data as transmitted from the gateway is transmitted to the user platform through the base station.

Here, the base station does not know that the S-UE and V-UE constitute the single user platform. Therefore, the base station plays only a role in transferring the downlink data as transmitted from the gateway to the S-UE and V-UE.

That is, when the gateway allocates the same IP address to the S-UE and the V-UE and transmits the data to the user platform using the allocated IP address as a destination address. Thus, the V-UE as well as the S-UE may receive the data. This may improve the data transmission rate.

At this time, the S-UE and V-UE may act as user equipments linked to each other.

Here, the linked user equipments may refer to user equipments that are included in the same user platform and share the upper layer (application layer, transmission layer, network layer) of the user platform.

The communication devices (e.g., S-UE, V-UE) constituting the user platform communicate with the network entity (e.g., base station, MME, etc.) in the network using the same communication protocol.

The network entity or network node processes each of the communication devices (S-UE, V-UE) constituting the user platform independently or individually using the same protocol.

Further, since each of the communication device constituting the same user platform must communicate with the cellular network, each communication device must be individually subscribed to the cellular network. That is, the user platform must be subscribed to the network times corresponding to the total number of communication devices that constitute the user platform.

In this way, the methods proposed herein may use a number of the mutually-linked communication devices included in the same user platform to receive the same service, thereby improving the data transmission rate.

FIG. 11 shows one example of parameter configuration for Quality of Service (QoS) management.

In order to improve the data transmission rate associated with the service from the specific user platform by allocating the same IP address to the plurality of the mutually-linked communication devices within the specific user platform, separate rate policing should be applied as shown in FIG. 11.

As shown in FIG. 11, SDF 1 is transmitted to V-UE and S-UE via two Default Bearers, while SDF 2 is transmitted to V-UE and S-UE via two dedicated bearers.

That is, multiple paths to different communication devices may be present for one SDF. Considering this, the following rate policing should be applied.

The rate policing to be considered for the data boosting proposed in this specification will be described.

First, the operations of the gateway may be divided into an operation related to the SDF and an operation related to the logical paths (for example, EPS Bearer, etc.) for data transmission/reception.

The gateway operates with a maximum bit rate (MBR) considering the multiple paths mapped to each SDF.

For example, the MBR may refer to the sum of the MAX Bit Rates of all user equipments, each of which maps to one SDF to constitute the multi-paths.

Further, the gateway distributes the downlink data so that the distribution rate does not exceed the QoS parameters (for example, MBR, APN-AMBR, and UE-AMBR) of each user equipment constituting the multi-paths.

Next, the user platform sublayer operation (adaptation) may be associated with the data logical path.

That is, the sublayer of the user platform operates to distribute the uplink data so that the distribution rate does not exceed the MBR and APN-AMBR of each of the user equipment constituting the multiple paths.

As described above, in the method proposed in the present specification, the separate rate policing may be applied to a plurality of communication devices allocated with the same IP address. As a result, the data transmission rate of the service provided to the user platform may be improved as compared with the case of receiving data using one communication device.

FIGS. 12 and 13 illustrate one example of a method for allocating a fixed IP address to a UE to which the present invention is applied and context information of the UE.

Referring to FIGS. 12 and 13, by configuring the same IP address to the UEs linked to each other through an initial access process, the same fixed IP address may be allocated to a plurality of UEs linked to each other, which constitute one user platform.

First, it is assumed that UE 1 and UE 2 belong to; the same user platform and are linked to each other.

More specifically, UE 1 performs the IMSI acquisition procedure described with reference to FIG. 7 to access the network.

In other words, UE 1, being in the RRC_Connected sate, transmits its IMSI to the MME via the eNB through an attach request message S12010. In the case of a UE which has once been attached to the network, since a GUTI may be allocated from the LTE network, the GUTI may be transmitted to the MME instead of the IMSI when the UE is attached again to the network.

The eNB transmits an initial UE message including the ID of a cell to which the UE has been attached (ECGI) and TAI information indicating in which tracking area the UE is located to the MME.

Through the IMSI acquisition procedure, the UE transitions to the ECM_Connected state, where the UE performs the authentication procedure and NAS security setting procedure described with reference to FIG. 7, S12020, S12030.

The HSS may configure context information of each of linked UEs supposed to form multiple paths corresponding to the same default access point name (APN) so that the UEs may transceive data with the same gateway through the same IP address.

In other words, the HSS stores the IP address of the same gateway (GW IP) corresponding to the same default APN and the IP address of the same UE (UE IP) to each of the context information of linked UEs.

FIG. 13(a) illustrates one example of context information of UE 1 stored in the HSS when the IMSI of the UE 1 is 15, and (b) illustrates one example of context information of UE 2 stored in the HSS when the IMSI of the UE 2 is 39.

As shown in FIGS. 13(a) and (b), since the UE 1 and 2 are linked to one user platform, each context information includes the same GW IP and the same UE IP address (UE fixed IP).

Also, each context information includes IMSI list information representing IMSIs of the UEs linked to the UE corresponding to the context information and QoS profile information corresponding to the IMSI of each of the UE 1 and UE 2.

At this time, the rate policing described with reference to FIG. 11 is applied to the QoS profile information.

In FIG. 13(a), since the UE 1 is linked to the UE 2, the context information of the UE 1 includes the IMSI of the UE 2 as the IMSI list information of linked UEs while in FIG. 13(b) the context information of the UE 2 includes the IMSI of the UE 1 as the IMSI list information of linked UEs.

The MME informs the HSS that the UE 1 has been attached and transmits a location update request message (first request message) to the HSS to request context information of the UE 1 S12040. The position request message may include the IMSI of the UE 1 and the MIME ID representing the MME.

The HSS stores the information received through the location update request message and transmits the location update response message (first response message) including the context information of the UE 1 to the MME S12050.

The MME stores the context information of the UE 1 received from the HSS and allocates the ID of an EPS bearer to generate the EPS bearer on the basis of the QoS profile included in the context information.

At this time, the HSS may transmit the location update response message by including therein not only the context information of the UE 1 but also the context information of the UE 2 linked to the UE 1; and the MME may also store and manage the context information of the UE 2.

Also, the MME may transmit the context information of the UE 1 and the ID of an allocated EPS bearer to a different MME managing the UE 2 linked to the UE 1; and receive the context information and the EPS bearer ID of the UE 2 from the different MME which manages the UE 2.

In other words, the MME may transmit the context information and EPS bearer ID of a LTE to at least one different MME which manages each of a plurality of UEs linked to the UE and receive the context information and EPS bearer ID of each of the plurality of UEs linked to the UE from at least one different MME in response to the transmission.

In this manner, as the MME receives, stores, and manages context information and EPS bearer IDs of not only the UE managed by the MME itself but also other linked UEs, when data transceiving is performed through UEs constituting a user platform, the MME may trigger generation of multi-paths.

Also, the MME may transmit a paging message simultaneously to the UEs constituting the user platform and thereby activate linked UEs.

The MME transmits a session creation request message (second request message) to the S-GW to create an EPS session (EPS bearer) on the basis of the QoS profile received from the HSS, and the S-GW transmits the session creation request message to the P-GW S12060.

The session creation request message may include the IMSI of the UE 1, allocated EPS bearer ID, GW-ID, the same UE IP address allocated to linked UEs, APN, QoS profile, ECGI, and TAI.

After receiving a session creation request message, if the same address as the IP address already used by a different UE (for example, UE 2) is included in a session configuration request message, the P-GW receives a final QoS profile compliant with the policy described with reference to FIG. 11 from a PCRF.

Also, the P-GW constructs a routing table for one or more SDFs transmitted to a plurality of linked UEs to manage multi-paths through multiple EPS bearers created by a plurality of linked UEs.

The P-GW creates an EPS bearer (GTP tunnel) on the basis of a final QoS profile received from the PCRF.

After creating the EPS bearer, the P-GW transmits a session creation response message including the final QoS profile to the S-GW.

The S-GW also creates an EPS bearer (GTP tunnel) on the basis of the final QoS profile received from the P-GW and transmits a session creation response message (a second response message) including the final QoS profile to the MME S12070.

The session creation response message may further include the IP address of a UE, ID of a created EPS bearer, TEID, and constructed routing template.

The MME transmits an attach accept message including the IP address to be used by the UE and the final QoS profile to the UE S12080.

Afterwards, since the UE 1 and the UE 2 have received the same IP address, the UE 1 and the UE 2 may transceive packets with the same P-GW to provide the same service.

For example, the eNB may transmit a plurality of packets constituting the SDF for providing a service from the P-GW by dividing the plurality of packets into the UE 1 and the UE 2.

Since data used for providing the same service to a plurality of UEs may be divided and transmitted as such by using the method described above, data transmission rate may be improved.

FIGS. 14 and 15 illustrate a method for allocating a dynamic IP address to a UE to which the present invention is applied and context information of the UE.

Referring to FIGS. 14 and 15, if a UE making an access request during the initial access process is one making an access request for the first time among linked UEs, a dynamic IP address is allocated to the UE through a gateway and is stored in the context information of the UE; thus the same dynamic IP address may be allocated to other linked UEs.

First, since the S14010 to S14040 steps are the same as the S12010 to S12040 steps of FIG. 12, descriptions thereof will be omitted.

When receiving a location update request from the MME, the HSS stores the information received through the location update request message and determines whether a UE which has attempted initial access is one which has first attempted access among linked UEs.

In other words, the HSS determines whether a UE which has attempted access is an M-UE.

More specifically, the HSS checks the context information of a UE corresponding to the identifier of the UE included in a location update request message transmitted from the MME (for example, IMSI).

The HSS checks whether the IP address of a gateway (GW-IP) corresponding to the default APN and a dynamic IP address of the UE are included in the context information of the UE and the context information of a different LIE linked to the UE.

If the IP address of the gateway (GW-IP) corresponding to the default APN and the dynamic IP address of the UE are not included in the context information of the UE and the context information of the different UE linked to the UE or are all null, the LTE which has attempted access becomes the one (M-UE) which has first attempted access among linked UEs.

FIGS. 15(a) and (b) illustrate one example of context information of UE 1 and UE 2 linked to each other when there is no UE attempting access to the network.

As shown in FIGS. 15(a) and (b), when neither of the UE 1 and the UE 2 linked to each other has accessed the network, context information of the UEs includes IMSI list information representing IMSIs of the UEs linked to each of the UEs and QoS profile information corresponding to the IMSI of each of the UE 1 and the UE 2, but does not include the GW-IP corresponding to the default APN and the dynamic IP addresses of the UE 1 and the UE 2.

The HSS, which has determined that the UE 1 is the M-UE, transmits a location update response message to the MME S14050.

Since the context information of the UE 1 does not include the GW-IP and the dynamic IP address of the UE 1, the location update response message includes only the IMSI of the UE 1, information of an APN to which the UE 1 is subscribed, and QoS profile.

The MME stores the context information of the UE 1 received from the HSS and allocates the ID of an EPS bearer to create the EPS bearer on the basis of the QoS profile included in the context information.

Also, since the context information of the UE 1 does not include the GW-IP address which is an IP address of the P-GW, the MME selects a P-GW corresponding to the subscribed APN.

The MME transmits a session creation request message to the S-GW to create an EPS session (EPS bearer) on the basis of the QoS profile received from the HSS, and the S-GW transmits the session creation request message to the P-GW 514060.

The session creation request message may include the IMSI of the UE 1, allocated EPS bearer ID, IP address of the selected P-GW, subscribed APN, QoS profile, ECGI, and TAI.

After receiving the session creation request message, the P-GW allocates a dynamic IP address to be used by the UE 1 and receives a final QoS profile compliant with the policy described with reference to FIG. 11 from the PCRF.

Also, the P-GW constructs a routing table for one or more SDFs transmitted to a plurality of linked UEs to manage multi-paths through multiple EPS bearers created by a plurality of linked UEs.

The P-GW creates an EPS bearer (GTP tunnel) on the basis of a final QoS profile received from the PCRF.

After creating the EPS bearer, the P-GW transmits a session creation response message including the final QoS profile to the S-GW.

The S-GW also creates an EPS bearer (GTP tunnel) on the basis of the final QoS profile received from the P-GW and transmits a session creation response message including the final QoS profile to the MME S14070.

The session creation response message may further include a dynamic IP address of the UE allocated by the P-GW, ID of a created EPS bearer, TEID, and constructed routing template.

The MME transmits an attach accept message including the IP address to be used by the UE and the final QoS profile to the UE S14080.

The MME transmits a UE context update request message including the IP address of the selected P-GW and the dynamic IP address of the UE allocated by the P-GW to the HSS S14090.

Through transmission of the UE context update request message, the MME may request the HSS to store the IP address of the P-GW selected by the context information of the UE 1 and the UE 2 linked to the UE 1; and the dynamic IP address of a UE allocated by the P-GW.

When receiving the UE context update request message, the HSS stores the address of the P-GW and the dynamic IP address of the UE included in the UE context update request message into the information related to a logical path to the corresponding APN.

In other words, the HSS stores the received address of the P-GW and dynamic IP address of the UE into the context information of the UE 1 and the UE 2.

The HSS transmits a UE context update response message indicating that the context information of the UE 1 and the UE 2 has been updated to the MME in response to the UE context update request message S14100.

Afterwards, since the UE 1 and the UE 2 have received the same dynamic IP address from the P-GW, the UE 1 and the UE 2 may transceive packets with the same P-GW to provide the same service.

For example, the eNB may transmit a plurality of packets constituting the SDF for providing a service from the P-GW by dividing the plurality of packets into the UE 1 and the UE 2.

Through the method described above, even when IP addresses are not allocated to a plurality of linked UEs constituting one user platform, the same dynamic UE IP may be allocated from the P-GW through the initial access process.

FIGS. 16 and 17 illustrate another example of a method for allocating a dynamic IP address to which the present invention is applied and context information of the UE.

Referring to FIGS. 16 and 17, if a UE making an access request during the initial access process is not one which first requests access among linked UEs, dynamic IP address of other UEs linked with the UE stored in the HSS may be allocated to the UE.

First, since the S16010 to S16040 steps are the same as the S12010 to S12040 steps of FIG. 12, descriptions thereof will be omitted.

When receiving a location update request from the MME, the HSS stores the information received through the location update request message and determines whether a UE which has attempted initial access is one which has first attempted access among linked UEs.

In other words, the HSS determines whether a UE which has attempted access is an M-UE.

More specifically, the HSS checks the context information of a UE corresponding to the identifier of the UE (for example, IMSI) included in a location update request message transmitted from the MME.

The HSS checks whether the IP address of a gateway (GW-IP) corresponding to the default APN and a dynamic IP address of the UE are included in the context information of the UE and the context information of a different UE linked to the UE.

If the context information of the UE and the context information of the different UE include the IP address (GW-IP) of a gateway corresponding to the default APN and the dynamic IP address of the UE, it indicates that there exists one among UEs linked to the UE, which has first attempted access, and therefore, the UE may be regarded as not being the first UE which has attempted access.

Therefore, the UE which has attempted access becomes an s-UE.

FIGS. 15(a) and (b) illustrate one example of context information of UE 1 and UE 2 linked to each other when there exists a UE attempting access to the network.

As shown in FIGS. 15(a) and (b), when either of the UE 1 and the UE 2 linked to each other has accessed the network, context information of the UEs includes not only IMSI list information representing IMSIs of the UEs linked to each of the UEs and QoS profile information corresponding to the IMSI of each of the UE 1 and the UE 2, but also the GW-IP corresponding to the default APN and the dynamic IP addresses of the UE 1 and the UE 2.

The HSS stores the information received through the S16040 step and transmits a location update response message including the context information of the UE 1 to the MME S16050.

The MME stores the context information of the UE 1 received from the HSS and allocates the ID of an EPS bearer to create the EPS bearer on the basis of the QoS profile included in the context information.

At this time, the HSS may transmit the location update response message by including therein not only the context information of the UE 1 but also the context information of the UE 2 linked to the UE 1; and the MME may also store and manage the context information of the UE 2.

Also, the MME may transmit the context information of the UE 1 and the ID of an allocated EPS bearer to a different MME managing the UE 2 linked to the UE 1; and receive the context information and the EPS bearer ID of the UE 2 from the different MME which manages the UE 2.

In other words, the MME may transmit the context information and EPS bearer ID of a UE to at least one different MME which manages each of a plurality of UEs linked to the UE and receive the context information and EPS bearer ID of each of the plurality of UEs linked to the UE from at least one different MME in response to the transmission.

The MME transmits a session creation request message to the S-GW to create an EPS session (EPS bearer) on the basis of the QoS profile received from the HSS, and the S-GW transmits the session creation request message to the P-GW S16060

The session creation request message may include the IMSI of the UE 1, allocated EPS bearer ID, GW-ID, the same UE IP address allocated to linked UEs, APN, QoS profile, ECGI, and TAI.

After receiving a session creation request message, if the same address as the IP address already used by a different UE (for example, UE 2) is included in a session configuration request message, the P-GW receives a final QoS profile compliant with the policy described with reference to FIG. 11 from a PCRF.

Also, the P-GW constructs a routing table for one or more SDFs transmitted to a plurality of linked UEs to manage multi-paths through multiple EPS bearers created by a plurality of linked UEs.

The P-GW creates an EPS bearer (GTP tunnel) on the basis of a final QoS profile received from the PCRF.

After creating the EPS bearer, the P-GW transmits a session creation response message including the final QoS profile to the S-GW.

The S-GW also creates an EPS bearer (GTP tunnel) on the basis of the final QoS profile received from the P-GW and transmits a session creation response message (a second response message) including the final QoS profile to the MME S16070.

The session creation response message may further include the IP address of a UE, ID of a created EPS bearer, TEID, and constructed routing template.

The MME transmits an attach accept message including the IP address to be used by the UE and the final QoS profile to the UE.

Afterwards, since the UE 1 and the UE 2 have received the same IP address, the UE 1 and the UE 2 may transceive packets with the same P-GW to provide the same service.

For example, the eNB may transmit a plurality of packets constituting the SDF for providing a service from the P-GW by dividing the plurality of packets into the UE 1 and the UE 2.

FIG. 18 is a flow diagram illustrating one example of an operation of an MME for allocating the same IP address to a plurality of linked UEs to which the present invention is applied.

As described in detail with respect to the operation of an MME for allocating the same IP address to the UEs linked to each other forming one platform in a network, when there is an access request from a UE, the MME may obtain an identifier (for example, IMSI) from an eNB, by which the UE requesting access may be identified.

To request the context information of an identified UE, the MME may transmit a first request message to the HSS S18010. The MME may receive a first response message including the context information of the UE from the HSS S18020. The MME transmits a second request message to the S-GW to create an EPS session (EPS bearer) on the basis of the context information of the UE received from the HSS, and the S-GW transmits the second request message to the P-GW S18030. When session configuration is completed, the MME may receive a second response message indicating completion of session configuration from the S-GW S18040. The MME may transmit an attach accept message including the IP address to be used by the UE and the final QoS profile to the UE.

The first request message may be called a location update request message and may include the IMSI and an MME ID representing the MME as described with reference to FIGS. 12 to 17.

The context information of a UE may include the information described with reference to FIG. 13, 15, or 17 depending on whether the UE is one among linked UEs belonging to one user platform, which first attempts access and whether the IP address allocated to the UE is a fixed IP address or a dynamic IP address.

The first response message may be called a location update response message and as described with reference to FIGS. 12 to 17, may include the context information of a UE which has attempted access and the context information of UEs linked to the UE which has attempted access.

The MME may transmit the context information of the UE and the EPS bearer ID allocated by the MME to at least one different MME which manages each of a plurality of UEs linked to the UE; and in response to the transmission, may receive the context information and ESP bearer ID of each of the plurality of UEs linked to the UE from the at least one different MME.

The second request message may be called a session creation request message and as described with reference to FIGS. 12 to 17, according to the context information of a UE which has attempted access, may include the IMSI of the UE, allocated EPS bearer ID, GW-ID, the same IP address of the UE allocated to linked UEs, APN, QoS profile, ECGI, and TAI.

The second response message may be called a session creation response message and as described with reference to FIGS. 12 to 17, may include a final QoS profile determined by the PCRF, allocated IP address of the UE (fixed IP address or dynamic IP address), ID of a created EPS bearer, TEID, and constructed routing template.

FIG. 19 is a flow diagram illustrating one example of an operation of an HSS for allocating the same IP address to a plurality of linked UEs to which the present invention is applied.

If a UE subscribes to the network, the HSS stores the context information of the UE. If a subscribing UE attempts access to access the network, the HSS may receive a first request message requesting the context information of the UE S19010. The HSS may determine whether a UE requesting access is one which has first attempted access among UEs linked to each other constituting a user platform on the basis of the context information of the UE. If the UE which has attempted access is not the one which has first attempted access, the HSS may transmit a response message including the context information of the UE to the MME S19020.

However, if a UE which has attempted access is the one which has first attempted access, the HSS may transmit a first response message in response to the first request message to the MME S19030. The HSS may receive a second request message requesting update of the context information of the UE from the MME S19040. The HSS updates the context information of the UE on the basis of the information included in the second request message (for example, stores new information into the context information of the UE) S19050 and transmits a second response message indicating update of the context information to the MME S19060.

The first request message may be called a location update request message and may include the IMSI and an MME ID representing the MME as described with reference to FIGS. 12 to 17.

The context information of a UE may include the information described with reference to FIG. 13, 15, or 17 depending on whether the UE is one among linked UEs belonging to one user platform, which first attempts access and whether the IP address allocated to the UE is a fixed IP address or a dynamic IP address.

The first response message may be called a location update response message and as described with reference to FIGS. 12 to 17, may include the context information of a UE which has attempted access and the context information of UEs linked to the UE which has attempted access.

The second request message may be called a UE context update request message and as described with reference to FIG. 14, may include the IP address of the P-GW selected by the MME and the dynamic IP address of the UE allocated by the P-GW.

The HSS may be requested to store the IP address of the P-GW selected by the context information of the UE which has requested access and UEs linked to the UE which has requested access; and the dynamic IP address of the UE allocated by the P-GW through reception of the UE context update request message.

When receiving the UE context update request message, the HSS stores the address of the P-GW included in the UE context update request message and the dynamic IP address of the UE in the information related to a logical path related to the corresponding APN. In other words, the HSS stores the received address of the P-GW and dynamic IP address of the UE in the context information of the UE which has requested access and UEs linked to the UE which has requested access.

The second response message may be called a UE context response message and indicate update of the context information of the UE which has requested access and other UEs linked to the UE which has requested access.

FIG. 20 shows one example of an internal block diagram of a wireless device to which the present invention may be applied.

Here, the wireless device may be an eNB and a UE, and the base station includes both a macro eNB and a small eNB.

As shown in FIG. 20, the eNB 2010 and the UE 2020 include communication units (transmitting/receiving units, RF units, 2013 and 2023), processors 2011 and 2021, and memories 2012 and 2022.

The eNB and the UE may further input units and output units.

The communication units 2013 and 2023, the processors 2011 and 2021, the input units, the output units, and the memories 2012 and 2022 are operatively connected with each other in order to conduct the methods as proposed in the present disclosure.

The communication units (transmitting/receiving units or RF units, 2013 and 2023), when receiving information created from a PHY (Physical Layer) protocol, transfer the received information through RF (Radio-Frequency) spectrums and conduct filtering and amplification, then transmit it through antennas. Further, the communication units transfer RF (Radio Frequency) signals received through the antennas to bands available to be processed in the PHY protocol and perform filtering.

In addition, the communication units may also include the functions of switches to switch transmitting and receiving functions.

The processors 2011 and 2021 implement functions, procedures, and/or methods as proposed in the present disclosure. The layers of radio interface protocols may be implemented by the processors.

The processors may be represented as control parts, controllers, control units, or computers.

The memories 2012 and 2022 are connected with the processors and store protocols or parameters for performing the function, procedure and/or method proposed in the present disclosure.

The processors 2011 and 2021 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other storage devices. The communication unit may include a base-band circuit for processing a radio signal. When the embodiment is implemented in software, the aforementioned methods may be implemented with a module (process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The method for direction-based searching a device proposed in the present disclosure, rather than limited to the configurations and methods according to the above-described embodiments, may be configured so that all or some of the embodiments may be selectively combined with each other to allow for various variations or modifications.

Meanwhile, the method for direction-based searching a device of the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present invention.

Further, both of the method invention and the device invention are described in the present disclosure, and both of the invention may be applied complementarily with each other as occasion demands.

INDUSTRIAL APPLICABILITY

The RRC connection method in the wireless communication system according to the present invention which may be applied to the 3GPP LTE/LTE-A system has been mainly described above. The present disclosure is not limited to this. The RRC connection method in the wireless communication system according to the present invention may be equally applied to various wireless communication systems in addition to the 3GPP LTE/LTE-A system.

What is claimed:

1. A method for allocating, by a first Mobility Management Entity (MME), an address of a UE to transceive in a wireless communication system, the method comprising:

transmitting a first request message requesting first context information of a UE to a home subscriber server (HSS);

receiving a first response message comprising the first context information from the HSS, wherein the first context information comprises an identifier for identifying the UE, a gateway Internet Protocol (IP) address, a first UE IP address allocated to the UE, and list information comprising an identifier of at least one UE linked to the UE and managed by a second MME;

based on the gateway IP address, transmitting a second request message to a gateway, the second request message requesting a session configuration for transceiving data of the UE, wherein the second request message includes the first context information;

receiving from the gateway a second response message comprising a session identifier indicating a session configured in response to the second request message, wherein the first UE IP address is also allocated to the at least one UE for transceiving data with the gateway; and receiving, from the second MME, second context information of the at least one UE, wherein based on the second context information and the first UE IP address allocated both the UE and the at least one UE, a plurality of data related to a specific service data flow is simultaneously provided to the UE and the at least one UE by the gateway.

2. The method of claim 1, further comprising:

transmitting the first context information to the second MME prior to receiving the second context information from the second MME.

3. The method of claim 1, wherein the plurality of data is provided based on a sum of all of maximum bit rates (MBRs) of each of the UE and the at least one UE.

4. The method of claim 1, wherein the plurality of data is provided through the session based on a Quality of Service (QoS) parameter of the session created between the UE and the at least one UE and the gateway.

5. The method of claim 1, wherein the plurality of data is provided based on a maximum bit rate or an access point name-aggregate maximum bit rate (APN-AMBR) of each of the UE and the at least one UE.

6. The method of claim 1, wherein the UE and the at least one UE belong to one platform.

7. A method for allocating, by home subscriber server (HSS), an address of a UE to transceive in a wireless communication system, the method comprising:

receiving a first request message requesting first context information of a first UE from a first Mobility Management Entity (MME), wherein the first request message comprises an identifier representing the first UE;

determining, based on the identifier, whether a UE attached to a network including the first MME exists among at least one UE linked to the first UE and managed by a second MME;

when the UE is determined to exist, transmitting, to the first MME, a first response message comprising an identifier of the UE among the at least one UE linked to the first UE, wherein the first response message further comprises a first UE IP address allocated to both the first UE and the UE among the at least one UE for transceiving data with a same gateway, wherein the first MME receives, from the second MME, second context information of the UE among the at least one UE, and wherein based on the second context information and the first UE IP address allocated both the UE and the UE among the at least one UE, a plurality of data related to a specific service data flow is simultaneously provided to the UE and the UE among the at least one UE by the same gateway.

8. The method of claim 7, further comprising checking whether first context information corresponding to the identifier comprises a gateway IP address representing a gateway corresponding to a default access point name (APN) and the first UE IP address.

9. The method of claim 7, further comprising when the UE is not determined to exist, receiving a second request message requesting an update of the first context information from the first MME, wherein the second request message comprises a UE IP address allocated to the first UE and a gateway IP address representing the same gateway;

updating the first context information with the UE IP address and the gateway IP address; and in response to the second request message, transmitting a second response message indicating the update of the first context information.

10. A first Mobility Management Entity (MME) for allocating an address for transceiving data in a wireless communication system, the first MME comprising:

a communication unit transmitting and receiving a radio signal to and from the outside; and processor functionally linked to the communication unit, wherein the processor is configured to:

transmit a first request message requesting first context information of a UE to a home subscriber server (HSS);

receive a first response message comprising the first context information from the HSS, wherein the first context information comprises an identifier for identifying the UE, a gateway Internet Protocol (IP) address, a first UE IP address allocated to the UE, and list information comprising an identifier of at least one UE linked to the UE and managed by a second MME;

based on the gateway IP address, transmit a second request message to a gateway, the second request message requesting a session configuration for transceiving data of the UE, wherein the second request message comprises the first context information;

receive from the gateway a second response message comprising a session identifier indicating a session configured in response to the second request message, wherein the first UE IP address is also allocated to the at least one UE for transceiving data with the gateway; and receive, from the second MME, second context information of the at least one UE, wherein based on the second context information and the first UE IP address allocated both the UE and the at least one UE, a plurality of data related to a specific service data flow is simultaneously provided to the UE and the at least one UE by the gateway.

* * * * *